(12) United States Patent
Gokturk et al.

(10) Patent No.: US 7,783,135 B2
(45) Date of Patent: Aug. 24, 2010

(54) SYSTEM AND METHOD FOR PROVIDING OBJECTIFIED IMAGE RENDERINGS USING RECOGNITION INFORMATION FROM IMAGES

(75) Inventors: Salih Burak Gokturk, Mountain View, CA (US); Dragomir Anguelov, San Francisco, CA (US); Vincent Vanhoucke, Menlo Park, CA (US); Kuang-Chih Lee, Mountain View, CA (US); Diem Vu, Mountain View, CA (US); Danny Yang, Palo Alto, CA (US); Munjal Shah, Los Altos, CA (US); Azhar Khan, San Francisco, CA (US)

(73) Assignee: Like.com, San Mateo, CA (US)

( * ) Notice: Subject to any disclaimer, the term of this patent is extended or adjusted under 35 U.S.C. 154(b) by 1228 days.

(21) Appl. No.: 11/246,434

(22) Filed: Oct. 7, 2005

(65) Prior Publication Data

US 2006/0251338 A1 Nov. 9, 2006

Related U.S. Application Data

(60) Provisional application No. 60/679,591, filed on May 9, 2005.

(51) Int. Cl.
*G06K 9/40* (2006.01)
(52) U.S. Cl. .......... 382/305; 382/209; 382/219
(58) Field of Classification Search ........ 382/118, 382/128, 209, 219, 305
See application file for complete search history.

(56) References Cited

U.S. PATENT DOCUMENTS

| | | | |
|---|---|---|---|
| 5,296,945 A * | 3/1994 | Nishikawa et al. ........ 358/518 |
| 5,450,504 A | 9/1995 | Calia | |
| 5,734,749 A | 3/1998 | Yamada et al. | |
| 5,781,650 A | 7/1998 | Lobo et al. | |
| 5,845,639 A * | 12/1998 | Hochman et al. ........ 600/407 |
| 5,982,912 A * | 11/1999 | Fukui et al. ........ 382/118 |
| 6,035,055 A | 3/2000 | Wang et al. | |
| 6,173,068 B1 * | 1/2001 | Prokoski ........ 382/115 |
| 6,353,823 B1 * | 3/2002 | Kumar ........ 707/3 |

(Continued)

FOREIGN PATENT DOCUMENTS

JP 2002-328925 11/2002

(Continued)

OTHER PUBLICATIONS

Final Office Action dated Oct. 20, 2008 for U.S. Appl. No. 11/543,758, 7 Pages.

(Continued)

*Primary Examiner*—Yosef Kassa
(74) *Attorney, Agent, or Firm*—Mahamedi Paradice Kreisman LLP

(57) ABSTRACT

An embodiment provides for enabling retrieval of a collection of captured images that form at least a portion of a library of images. For each image in the collection, a captured image may be analyzed to recognize information from image data contained in the captured image, and an index may be generated, where the index data is based on the recognized information. Using the index, functionality such as search and retrieval is enabled. Various recognition techniques, including those that use the face, clothing, apparel, and combinations of characteristics may be utilized. Recognition may be performed on, among other things, persons and text carried on objects.

28 Claims, 16 Drawing Sheets

U.S. PATENT DOCUMENTS

| | | | |
|---|---|---|---|
| 6,397,219 B2 * | 5/2002 | Mills | 707/10 |
| 6,418,430 B1 | 7/2002 | DeFazio et al. | |
| 6,427,020 B1 * | 7/2002 | Rhoads | 382/100 |
| 6,546,185 B1 * | 4/2003 | Kim et al. | 386/46 |
| 6,556,713 B2 | 4/2003 | Kobayashi et al. | |
| 6,606,417 B1 | 8/2003 | Brechner | |
| 6,785,421 B1 | 8/2004 | Gindele et al. | |
| 6,801,641 B2 * | 10/2004 | Eraslan | 382/118 |
| 6,819,783 B2 | 11/2004 | Goldberg et al. | |
| 6,919,892 B1 * | 7/2005 | Cheiky et al. | 345/473 |
| 6,925,197 B2 * | 8/2005 | Dimitrova et al. | 382/118 |
| 7,006,236 B2 | 2/2006 | Tomasi et al. | |
| 7,006,881 B1 * | 2/2006 | Hoffberg et al. | 700/83 |
| 7,027,054 B1 * | 4/2006 | Cheiky et al. | 345/473 |
| 7,140,550 B2 * | 11/2006 | Ramachandran | 235/493 |
| 7,203,356 B2 | 4/2007 | Gokturk et al. | |
| 7,310,431 B2 | 12/2007 | Gokturk et al. | |
| 7,324,693 B2 * | 1/2008 | Chen | 382/199 |
| 7,340,077 B2 | 3/2008 | Gokturk et al. | |
| 7,382,903 B2 | 6/2008 | Ray | |
| 7,519,200 B2 | 4/2009 | Gokturk et al. | |
| 7,542,610 B2 | 6/2009 | Gokturk et al. | |
| 2001/0033690 A1 | 10/2001 | Berche et al. | |
| 2002/0097893 A1 | 7/2002 | Lee et al. | |
| 2002/0103813 A1 | 8/2002 | Frigon | |
| 2002/0107718 A1 | 8/2002 | Morrill et al. | |
| 2002/0114522 A1 | 8/2002 | Seeber | |
| 2002/0187774 A1 | 12/2002 | Ritter et al. | |
| 2003/0028451 A1 | 2/2003 | Ananian | |
| 2003/0063779 A1 | 4/2003 | Wrigley | |
| 2003/0169906 A1 | 9/2003 | Gokturk et al. | |
| 2003/0195901 A1 | 10/2003 | Shin et al. | |
| 2003/0202683 A1 | 10/2003 | Ma et al. | |
| 2004/0003001 A1 | 1/2004 | Shimura | |
| 2004/0264810 A1 | 12/2004 | Taugher et al. | |
| 2005/0002568 A1 | 1/2005 | Chupeau et al. | |
| 2005/0078885 A1 | 4/2005 | Ozaki et al. | |
| 2005/0094897 A1 | 5/2005 | Zuniga | |
| 2005/0111737 A1 | 5/2005 | Das et al. | |
| 2005/0271304 A1 | 12/2005 | Retterath et al. | |
| 2006/0097988 A1 | 5/2006 | Hong | |
| 2006/0133699 A1 | 6/2006 | Widrow et al. | |
| 2006/0143176 A1 | 6/2006 | Mojsilovic et al. | |
| 2006/0173560 A1 | 8/2006 | Widrow et al. | |
| 2006/0227992 A1 | 10/2006 | Rathus et al. | |
| 2006/0251292 A1 | 11/2006 | Gokturk et al. | |
| 2006/0251339 A1 | 11/2006 | Gokturk et al. | |
| 2006/0253491 A1 | 11/2006 | Gokturk et al. | |
| 2007/0003113 A1 | 1/2007 | Goldberg | |
| 2007/0081744 A1 | 4/2007 | Gokturk et al. | |
| 2007/0258645 A1 | 11/2007 | Gokturk et al. | |
| 2008/0080745 A1 | 4/2008 | Gokturk et al. | |
| 2008/0082426 A1 | 4/2008 | Gokturk et al. | |
| 2008/0091572 A1 | 4/2008 | Kraft et al. | |
| 2008/0144943 A1 | 6/2008 | Gokturk et al. | |
| 2008/0152231 A1 | 6/2008 | Gokturk et al. | |
| 2008/0177640 A1 | 7/2008 | Gokturk et al. | |
| 2008/0199075 A1 | 8/2008 | Gokturk et al. | |
| 2008/0212849 A1 | 9/2008 | Gao | |
| 2008/0212899 A1 | 9/2008 | Gokturk et al. | |
| 2009/0034782 A1 | 2/2009 | Gering | |
| 2009/0177628 A1 | 7/2009 | Yanagisawa et al. | |
| 2009/0196510 A1 | 8/2009 | Gokturk et al. | |
| 2009/0208116 A1 | 8/2009 | Gokturk et al. | |

FOREIGN PATENT DOCUMENTS

| | | |
|---|---|---|
| JP | 2003-216866 A | 7/2003 |
| JP | 2004-220074 A | 8/2004 |
| JP | 2006-119836 | 5/2006 |
| JP | 2006-113836 | 11/2006 |
| KR | 1020070077908 A | 7/2007 |

OTHER PUBLICATIONS

Final Office Action dated Aug. 11, 2008 for U.S. Appl. No. 11/246,741, 18 Pages.
International Preliminary Report on Patentability in Application PCT/US2006/038864, Nov. 27, 2008, 10 pages.
International Preliminary Report on Patentability and Written Opinion of the International Searching Authority in Application PCT/US2006/018016, Oct. 16, 2008, 12 pages.
International Search Report and Written Opinion of the International Searching Authority in Application PCT/US06/38864, U.S.International Searching Authority, Oct. 14, 2008, 16 pages.
International Search Report and Written Opinion of the International Searching Authority in Application PCT/US07/83935, U.S.International Searching Authority, Aug. 18, 2008, 23 pages.
International Search Report and Written Opinion of the International Searching Authority in Application PCT/US06/18016, U.S.International Searching Authority, Jun. 17, 2008, 17 pages.
Non-Final Office Action dated Dec. 29, 2008 for U.S. Appl. No. 11/246,589, 19 Pages.
Non-Final Office Action dated Oct. 21, 2008 for U.S. Appl. No. 11/936,705, 18 Pages.
Non-Final Office Action dated Oct. 16, 2008 for U.S. Appl. No. 11/777,070, 10 Pages.
Non-Final Office Action dated Dec. 30, 2008 for U.S. Appl. No. 11/936,713, 15 Pages.
Non-Final Office Action dated Oct. 27, 2008 for U.S. Appl. No. 11/936,734, 7 Pages.
Non-Final Office Action dated Dec. 6, 2007 for U.S. Appl. No. 11/246,741, 31 Pages.
Non-Final Office Action dated Jun. 3, 2008 for U.S. Appl. No. 11/246,742, 16 Pages.
Non-Final Office Action dated Jun. 6, 2008 for U.S. Appl. No. 11/543,758, 13 Pages.
Notice of Allowance dated Dec. 22, 2008 for U.S. Appl. No. 11/246,742, 12 Pages.
U.S. Appl. No. 11/936,694, filed Nov. 7, 2007, Gokturk, et al.
U.S. Appl. No. 11/936,705, filed Nov. 7, 2007, Gokturk, et al.
U.S. Appl. No. 11/936,713, filed Nov. 7, 2007, Gokturk, et al.
U.S. Appl. No. 11/936,734, filed Nov. 7, 2007, Gokturk, et al.
Tu, Zhuowen et al., "Image Parsing: Unifying Segmentation, Detection, and Recognition," Proceedings of the Ninth IEEE International Conference on Computer Vision (ICCV 2003), University of California, Los Angeles, Los Angeles, CA 90095, 7 pages.
Yuille, A.L. et al, "Signfinder: Using Color to detect, localize and identify informational signs," Proceedings International Conference on Computer Vision, ICCV, 1998, Smith-Kettlewell Eye Research Institute, 2318 Fillmore Street, San San Francisco, CA 94115, 9 pages.
U.S. Appl. No. 12/395,422, filed Feb. 27, 2009, Gokturk et al.
U.S. Appl. No. 12/431,706, filed Apr. 28, 2009, Gokturk et al.
Final Office Action dated Jun. 16, 2009 for U.S. Appl. No. 11/936,705, 20 Pages.
Final Office Action dated Aug. 11, 2008 for U.S. Appl. No. 11/246,741, 18 Pages.
Final Office Action dated Oct. 20, 2008 for U.S. Appl. No. 11/543,758, 7 Pages.
International Preliminary Report on Patentability and Written Opinion of the International Searching Authority in Application PCT/US2007/083935, May 22, 2009. 20 pages.
Notice of Allowance dated Apr. 17, 2009 for U.S. Appl. No. 11/543,758, 14 Pages.
Final Office Action dated Oct. 27, 2009 for U.S. Appl. No. 11/246,741, 20 Pages.
Final Office Action dated Jul. 7, 2009 for U.S. Appl. No. 11/777,070, 10 Pages.
Final Office Action dated Jun. 30, 2009 for U.S. Appl. No. 11/246,589, 13 Pages.
Non-Final Office Action dated Dec. 2, 2009 for U.S. Appl. No. 11/246,589. 14pages.

Non-Final Office Action dated Sep. 30, 2009 for U.S. Appl. No. 12/431,706. 9 pages.

Non-Final Office Action dated Aug. 6, 2009 for U.S. Appl. No. 11/936,734, 6 Pages.

Non-Final Office Action dated Apr. 7, 2009 for U.S. Appl. No. 11/246,741, 21 Pages.

Notice of Allowance dated Sep. 17, 2009 for U.S. Appl. No. 11/936,705 14 Pages.

Notice of Allowance dated Sep. 28, 2009 for U.S. Appl. No. 11/936,713, 15 Pages.

Notice of Allowance dated Oct. 1, 2009 for U.S. Appl. No. 11/936,734, 12 Pages.

Action Closing Prosecution mailed Apr. 26, 2010 for U.S. Appl. No. 95/001,307; 20 pages.

Final Office Action mailed May 12, 2010 for U.S. Appl. No. 12/431,706; 12 pages.

Gangopadhyay, Aryya, "An image-based system for electronic retailing", Decision Support Systems 32, 2001, Department of Information Systems, University of Mayland Baltimore County, 1000 Hilltop Circle, ACIV 481, Baltimore, MD 21250, 10 pages.

International Search Report and Written Opinion mailed Feb. 24, 2010 in PCT/US2009/050600 13 pgs.

Lii, Yi et al., "Object Recognition for Content-Based Image Retrieval", Department of Computer Science and Engineering, University of Washington, Seattle, WA 98195-2350, Jan. 2002, 21 pages.

Liu, James et al., "Smart Shopper: An Agent-Based Web-Mining Approach to Internet Shopping,"IEEE Transactions on Fuzzy Systems, vol. 11, No. 2, Apr. 2003,12 pages.

Non-Final Office Action dated Dec. 15, 2009 for U.S. Appl. No. 12/395,422; 10 pages.

Notice of Allowance dated Mar. 1, 2010 for U.S. Appl. No. 11/777,070; 11 pages.

Order Granting Request for Inter Parts Reexamination mailed Apr. 26, 2010 for U.S. Appl. No. 95/001,30; 15 pages.

Replacement Request for Ex Parte Reexamination dated Mar. 18, 2010 for U.S. Appl. No. 95/001,307; 145 pages.

Wang, James et al., "SIMPLIcity: Semantics-Sensitive Integrated Matching for Picture Libraries" IEEE Transactions on Pattern Analysis and Machine Intelligence, vol. 23, No. 9, Sep. 2001, 17 pages.

* cited by examiner

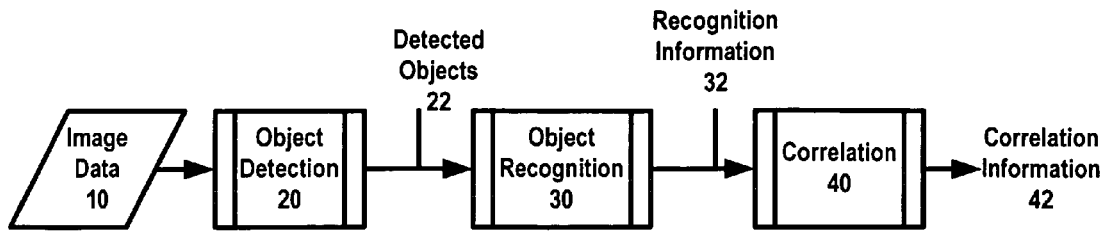
FIG. 1
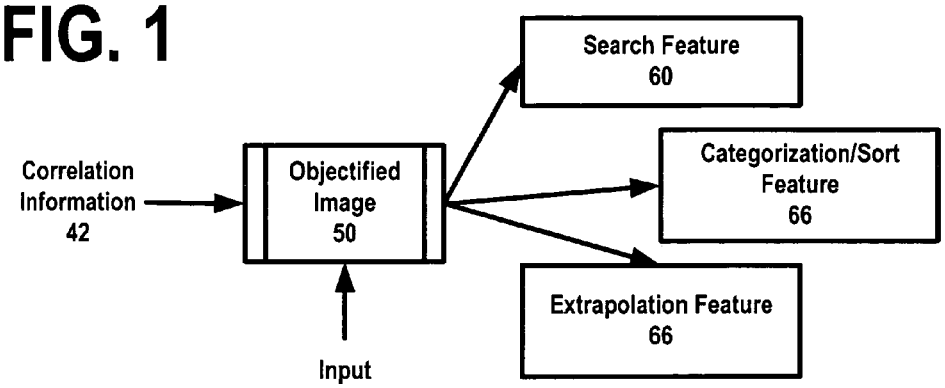
FIG. 2
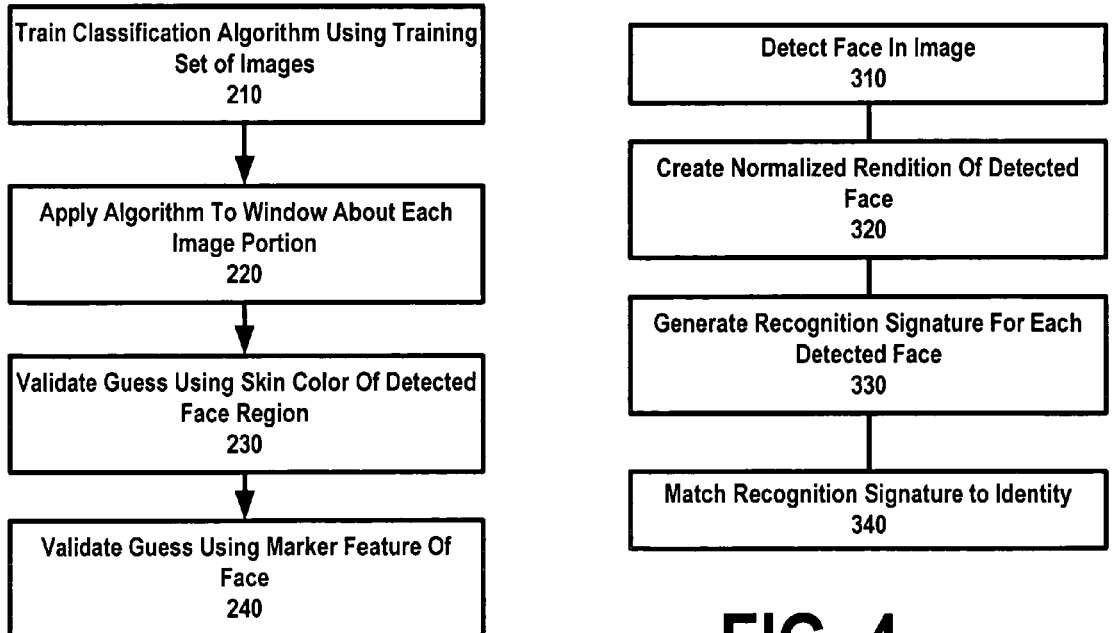
FIG. 3
FIG. 4

ANIMALS    ANIMALS

FIG. 10B

BOUTIQ    BOUTIQUE

FIG. 10C

SHOP → SHOP

ASHBURY → ASHBURY    FIG. 10D

Universal City → Universal City

SYSTEM AND METHOD FOR PROVIDING OBJECTIFIED IMAGE RENDERINGS USING RECOGNITION INFORMATION FROM IMAGES

RELATED APPLICATIONS

This application claims benefit of priority to U.S. Provisional Patent Application No. 60/679,591, entitled METHOD FOR TAGGING IMAGES, filed May 9, 2005; the aforementioned priority application being hereby incorporated by reference in its entirety.

TECHNICAL FIELD

The disclosed embodiments relate generally to the field of digital image processing. More particularly, the disclosed embodiments relate to a system and method for enabling the use of captured images.

BACKGROUND

Digital photography has become a consumer application of great significance. It has afforded individuals convenience in capturing and sharing digital images. Devices that capture digital images have become low-cost, and the ability to send pictures from one location to the other has been one of the driving forces in the drive for more network bandwidth.

Due to the relative low cost of memory and the availability of devices and platforms from which digital images can be viewed, the average consumer maintains most digital images on computer-readable mediums, such as hard drives, CD-Roms, and flash memory. The use of file folders are the primary source of organization, although applications have been created to aid users in organizing and viewing digital images. Some search engines, such as GOOGLE, also enables users to search for images, primarily by matching text-based search input to text metadata or content associated with images.

BRIEF DESCRIPTION OF THE DRAWINGS

FIG. 1 illustrates a sequence of processes which may be performed independently in order to enable various kinds of usages of images, according to an embodiment.

FIG. 2 illustrates an embodiment in which the correlation information may be used to create objectified image renderings, as well as enable other functionality FIG. 3 describes a technique for detecting a face in an image, under an embodiment of the invention.

FIG. 4 illustrates a technique for recognizing a face in an image, under an embodiment of the invention.

FIG. 10B and FIG. 10C illustrate examples of a text stretching post-processing technique for text in images, under an embodiment of the invention.

FIG. 10D illustrates examples of a text tilting post-processing technique for text in images, under an embodiment of the invention.

DETAILED DESCRIPTION

Figure 5:
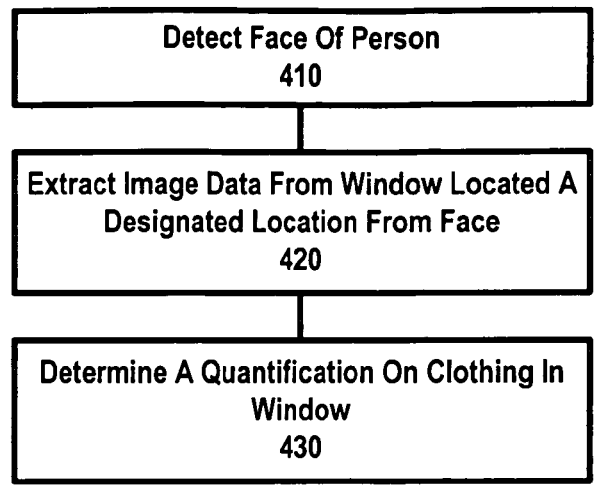
FIG. 5 illustrates a technique for recognizing a person in an image using clothing and/or apparel worn by the person in the image, under an embodiment of the invention.

Embodiments described herein provide for various techniques that enable the programmatic of digitally captured images using, among other advancements, image recognition. Embodiments described herein mine image files for data and information that enables, among other features, the indexing of the contents of images based on analysis of the images. Additionally, images may be made searchable based on recognition information of objects contained in the images. Other embodiments provide for rendering of image files in a manner that makes recognition information about objects those images usable. Numerous other applications and embodiments are provided.

Various applications and implementations are contemplated for one or more embodiments of the invention. In the context of consumer photographs, for example, embodiments of the invention enable users to (i) categorize, sort, and label their images quickly and efficiently through recognition of the contents of the images, (ii) index images using recognition, and (iii) search and retrieve images through text or image input. For these purposes, recognition may be performed on persons, on text carried on objects, or on other objects that are identifiable for images. Techniques are also described in which images may be rendered in a form where individual objects previously recognized are made selectable or otherwise interactable to the user. Network services are also described that enable online management and use of consumer photographs. Additionally, embodiments contemplate amusement applications where image recognition may be used to match people who are look-alikes. Social network and image-based as insertion applications are also contemplated and described with embodiments of the invention.

An embodiment provides for enabling retrieval of a collection of captured images that form at least a portion of a library of images. For each image in the collection, a captured image may be analyzed to recognize information from image data contained in the captured image. An index may be generated based on the recognized information. Using the index, functionality such as search and retrieval is enabled. Various recognition techniques, including those that use the face, clothing, apparel, and combinations of characteristics may be utilized. Recognition may be performed on, among other things, persons and text carried on objects.

Among the various applications contemplated, embodiments enable the search and retrieval of images based on recognition of objects appearing in the images being searched. Furthermore, one or more embodiments contemplate inputs that correspond to text or image input for purpose of identifying a search criteria. For example, an input may correspond to an image specified by a user, and that image is used to generate the search criteria from which other images are found.

For persons, embodiments provide for detection and recognition of faces. Additionally, one or more embodiments described enable recognition of persons to be based at least in part on clothing or apparel worn by those persons. Under one embodiment, a person may be detected from a captured image. Once the detection occurs, recognition information may be generated from the clothing or apparel of the person. In one embodiment, the person is detected first, using one or more markers indicating people (e.g. skin and/or facial features), and then the position of the clothing is identified from the location of the person's face. The recognition information of the clothing may correlate to the coloring present in a region predetermined in relative location to the detected face, taking into account the proportionality provided from the image.

According to another embodiment, information about captured images be determined by identifying a cluster of images from a collection of captured images. The cluster may be based on a common characteristic of either the image or of the image file (such as metadata). In one embodiment, a recognition signature may be determined for a given person appearing in one of the cluster of images. The recognition signature may be used in identifying a recognition signature of one or more persons appearing in any one of the cluster of images.

In one embodiment, the persons in the other images are all the same person, thus recognition of one person leads to all persons (assuming only one person appears in the images in the cluster) in the cluster being identified as being the same person.

According to another embodiment, a collection of images may be organized using recognition. In particular, an embodiment provides for detecting and recognizing texts carried on objects. When such text is recognized, information related to the text may be used to categorize the image with other images. For example, the text may indicate a location because the name of the city, or of a business establishment for which the city is known, appears on a sign or other object in the image.

According to another embodiment, recognition is performed on captured images for purpose of identifying people appearing in the images. In one embodiment, image data from the captured image is analyzed to detect a face of a person in the image. The image data is then normalized for one or more of the following: lighting, orientation, and size or relative size of the image.

In another embodiment, recognition may also be performed using more than one marker or physical characteristic of a person. In one embodiment, a combination of two or more markers are used. Specifically, embodiments contemplate generating a recognition signature based on recognition information from two or more of the following characteristics: facial features (e.g. eye or eye region including eye brow, nose, mouth, lips and ears), clothing and/or apparel, hair (including color, length and style) and gender.

According to another embodiment, metadata about the image file, such as the time the image was captured, or the location from which the image was captured, may be used in combination with recognition information from one or more of the features listed above.

In another embodiment, content analysis and data inference is used to determine a recognition signature for a person. For example, relationships between people in images may be utilized to use probabilities to enhance recognition performance.

In another embodiment, images are displayed to a user in a manner where recognized objects from that image are made user-interactive. In one embodiment, stored data that corresponds to an image is supplemented with metadata that identifies one or more objects in the captured image that have been previously recognized. The captured image is then rendered, or made renderable, using the stored data and the metadata so that each of the recognized objects are made selectable. When selected, a programmatic action may be performed, such as the display of the supplemental information, or a search for other images containing the selected object.

According to another embodiment, an image viewing system is provided comprising a memory that stores an image file and metadata that identifies one or more objects in the image file. The one or more objects have recognition information associated with them. A user-interface or viewer may be provided that is configured to use the metadata to display an indication or information about the one or more objects.

As used herein, the term "image data" is intended to mean data that corresponds to or is based on discrete portions of a captured image. For example, with digital images, such as those provided in a JPEG format, the image data may correspond to data or information about pixels that form the image, or data or information determined from pixels of the image.

The terms "recognize", or "recognition", or variants thereof, in the context of an image or image data (e.g. "recognize an image") is meant to means that a determination is made as to what the image correlates to, represents, identifies, means, and/or a context provided by the image. Recognition does not mean a determination of identity by name, unless stated so expressly, as name identification may require an additional step of correlation.

As used herein, the terms "programmatic", "programmatically" or variations thereof mean through execution of code, programming or other logic. A programmatic action may be performed with software, firmware or hardware, and generally without user-intervention, albeit not necessarily automatically, as the action may be manually triggered.

One or more embodiments described herein may be implemented using programmatic elements, often referred to as modules or components, although other names may be used. Such programmatic elements may include a program, a subroutine, a portion of a program, or a software component or a hardware component capable of performing one or more stated tasks or functions. As used herein, a module or component, can exist on a hardware component independently of other modules/components or a module/component can be a shared element or process of other modules/components, programs or machines. A module or component may reside on one machine, such as on a client or on a server, or a module/component may be distributed amongst multiple machines, such as on multiple clients or server machines. Any system described may be implemented in whole or in part on a server, or as part of a network service. Alternatively, a system such as described herein may be implemented on a local computer or terminal, in whole or in part. In either case, implementation of system provided for in this application may require use of memory, processors and network resources (including data ports, and signal lines (optical, electrical etc.), unless stated otherwise.

Embodiments described herein generally require the use of computers, including processing and memory resources. For example, systems described herein may be implemented on a server or network service. Such servers may connect and be used by users over networks such as the Internet, or by a combination of networks, such as cellular networks and the Internet. Alternatively, one or more embodiments described herein may be implemented locally, in whole or in part, on computing machines such as desktops, cellular phones, personal digital assistances or laptop computers. Thus, memory, processing and network resources may all be used in connection with the establishment, use or performance of any embodiment described herein (including with the performance of any method or with the implementation of any system).

Furthermore, one or more embodiments described herein may be implemented through the use of instructions that are executable by one or more processors. These instructions may be carried on a computer-readable medium. Machines shown in figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g. mobile devices such as cell phones) are all examples of machines and devices that utilize processors, memory, and instructions stored on computer-readable mediums.

Overview

FIG. 1 illustrates a sequence of processes which may be performed independently or otherwise, in order to enable various kinds of usages of images, according to an embodiment. A sequence such as illustrated by FIG. 1 is intended to illustrate just one implementation for enabling the use of captured images. As described below, each of the processes in the sequence of FIG. 1 may be performed independently, and with or without other processes described. Furthermore, other processes or functionality described elsewhere in this application may be implemented in addition to any of the processes illustrated by FIG. 1. While FIG. 1 illustrates an embodiment that utilizes a sequence of processes, each of the processes and sub-processes that comprise the described sequence may in and of itself form an embodiment of the invention.

In FIG. 1, image data 10 is retrieved from a source. The image data 10 may correspond to a captured image, or portion or segment thereof. A system may be implemented in which one or more types of objects may be detected and recognized from the captured image. One or more object detection processes 20 may perform detection processes for different types of objects identified from the image data. In an embodiment, the object detected is a person, or a portion of a person, such as a face, a body, a hair or other characteristic. Numerous other types of objects may be detected by the one or more object detection processes, including (i) objects carrying text or other alphanumeric characters, and (ii) objects associated with people for purpose of identifying an individual. An example of the latter type of object includes apparel, such as a purse, a briefcase, or a hat. Other types of objects that can be detected from object detection processes include animals (such as dogs or cats), and landmarks.

Detected objects 22 are then analyzed and possibly recognized by one or more object recognition processes 30. Different recognition results may be generated for different types of objects. For persons, the recognition processes 30 may identify or indicate (such as by guess) one or more of the following for a given person: identity, ethnic classification, hair color or shape, gender, or type (e.g. size of the person). For objects carrying text, the recognition information may correspond to alphanumeric characters. These characters may be identified as guesses or candidates of the actual text carried on the detected object. For other types of objects, the recognition information may indicate or identify any one or more of the following: what the detected object is, a class of the detected object, a distinguishing characteristic of the detected object, or an identity of the detected object.

As the above examples illustrate, recognition information may recognize to different levels of granularity. In the case where the detected object is a person, the recognition information may correspond to a recognition signature that serves as a relatively unique identifier of that person. For example, a recognition signature may be used to identify an individual from any other individual in a collection of photographs depicting hundreds, thousands, or even millions of individual (depending on the quality and/or confidence of the recognition). Alternatively, recognition information may only be able to identify a person as belonging to a set of persons that are identifiable from other persons in the same pool of people. For example, the recognition information may identify people by ethnic class or gender, or identify a person as being one of a limited number of matching possibilities.

In an embodiment, recognition information is a quantitative expression. According to one implementation, for example, a recognition signature may correspond to a highly dimensional vector or other dimensional numerical value.

Once the recognition information 32 is generated, a correlation process 40 can be used to correlate the detected and recognized object of the image with data and information items, and/or other information resources. Various types of functionality may be enabled with the correlation process 40, including for example, search, categorization, and text object research. In one embodiment, the recognized object is a person, or a portion of a person. In such an embodiment, the correlation process 40 generates correlation information 42 that is an identity, or more generally identification information to the person. In another embodiment, the recognized object carries text, and the correlation information 42 assigns meaning or context to the text.

As an alternative or addition to the correlation information described above, in another embodiment, correlation process 40 may, for a recognized face, generate correlation information 42 that correlates the recognition information 32 with other images that have been determined to carry the same recognized face. Thus, one recognition signature may be correlated to a collection of digital photographs carrying the same person. Examples of the types of information items and resources that recognized objects can be correlated to include some or all of the following: other images with the same recognition information or signature, clothing recognition information, text based content associated with a recognized object, audio or video content associated with the recognized object, other images that contain objects with similar but not the same detected object, or third-party Internet search engines that can retrieve information in response to specified criteria.

With regard to text carrying objects, the correlation process 40 may correlate recognition information 32 in the form of a string of alphanumeric characters, to a meaning or context, such as to a proper name, classification, brand-name, or dictionary meaning. As an addition or alternative, the correlation process 40 may generate correlation information 42 that indirectly correlates recognition information 32 to recognized word. For example the recognition information 32 may correlate the popular name of a hotel with a city where the hotel is located.

According to an embodiment, correlation information 42 resulting from the correlation process 40 may be stored or otherwise used for various purposes and functionality. In one implementation, correlation information 42 may be provided in the form of metadata that is carried with an image file, or it may be in the form of index data that forms a portion of an index. For example, one embodiment provides for an index that associates recognition information of a detected object with images that contain the same recognized object.

FIG. 2 illustrates an embodiment in which the correlation information 42 may be used to create objectified image renderings 50, as well as enable other functionality. The objectified image renderings are images that are displayed with individually detected objects being separately selectable, as a form of a graphic user-interface feature. As described with FIG. 18, for example, the objectified image rendering 50 enables detected/recognized objects to be made in focus and/or selectable by input operations of the user provided in selectable form. As an example, a user may hover a pointer over a face in the image and have that image be made selectable. The user may enter an input 52 that causes a programmatic function to be performed in which the correlation information 42 is used to present additional information from the object selected from the rendering 50. Further description of objectified image renderings 50 are provided elsewhere in this application.

The objectified image renderings 50 may (but not necessarily) be provided as a precursor to other functionality that takes use of the object detection process 20, object recognition process 30, and object correlation process 40. In one embodiment, a search feature 60 may be enabled that enables a user to specify a selectable object from a rendering as a search input. In this way, a user can specify an image as the search input. For example, if the objectified image rendering 50 displays a party scene with a recognized face provided as a selectable feature, a user can manipulate a mouse or other pointer device to select the face as input. The face then becomes the search criteria, and a search operation may be performed using the selected face. As will be described, the search may be performed on a library of images residing locally or over a network (in whole or in part).

Other types of functionality that may be provided include categorization or sort feature 66, where images are clustered are grouped together based on a common feature (e.g. a recognized object). As an example, the user's input may correspond to a selection of a selectable object in an image (such as described with FIG. 18). In the example provided above, selection of the face may result in other images with the same face being clustered together.

An extrapolation feature 70 is another type of functionality that can be provided in connection with the objectified image renderings 50. The extrapolation feature may take a recognized object (made selectable in the objectified image renderings 50) and make that selection the basis of an intelligent information or content gathering (including other images). For example, if the recognized object corresponds to recognized text carried on an object, a context of that text, as well as other useful information about the text (or the object carrying it) may be provided. With a face, an embodiment may provided that the extrapolation feature 70 presents similar faces (people who look like the recognized face), as well as celebrities or dogs who look like the recognized face.

While embodiments of the invention provide that a given object or type of object can be detected and recognized when the given object appears in a digital image, it should be noted that detection, recognition and correlation may be performed differently performed for different types of objects. Embodiments described herein provide two types of objects as being of particular interest for detection and recognition: (i) persons, and (ii) objects carrying text. However, other types of objects may also be of interest to one or more embodiments, including dogs, cats, geographic sites and landmarks, much of the details provided in embodiments described below are specific to persons and text-carrying objects.

Persons

There are different levels to which people may be recognized. Recognition information for a person may yield the identity of the person when recognition can be well-performed. However, recognition information can also be performed to a lesser degree that identity determination, such as when the picture being used is of poor quality, or when the specific recognition algorithm is not capable of yielding the identity. In such cases, the result of the recognition algorithm may be a class (gender or race) of people that the person belongs to, or a set of people that are candidates as being the person in the image. In another embodiment, the result of the recognition algorithm may be similar looking people, or even similar things (such as animals).

According to an embodiment, recognition of persons involves (i) detection of a person in an image being analyzed, and (ii) recognition of the detected person. Detection and recognition may employ specific characteristics, features, or other recognizable aspects of people in pictures. As such, each of detection and/or recognition may employ facial features, clothing, apparel, and other physical characteristics in determining recognition information about a person. Additionally, as will be described, metadata from the captured image, such as the date and time when the image was captured, may be used to facilitate recognition. If metadata exists about the location of where the image was taken (e.g. such as through a base station stamp if the picture is taken from a cellular telephone device, or from global-positioning information integrated into the device), the location information may also be used to aid recognition. Additionally, as will be further or described, one or more embodiments may employ a context, setting, or information about other objects (such as recognition information about other persons appearing in an image) to aid the recognition of a given person in an image.

In one embodiment, detection of a person is a separately performed process from recognition of the person. The detection of persons may be accomplished in-part by analyzing, scanning, or inspecting images for a feature common to at least most individuals. A feature that signals the presence of a particular object or type of object may be referred to as a marker feature. One or more embodiments provide for the use of the human face as the primary physical feature from which detection and recognition of a person in an image is performed. For faces, a specific type of marker feature is a facial feature, such as eyes (eye brow, eye socket, iris or eyelid), nose (nose tip, nostril) or mouth (lips, shape). A specific type of feature contemplated is a facial feature. However, other examples of marker features include clothing, apparel, hair style, shape or color, and body shape. Accordingly, one embodiment provides that detection may be performed as a precursor to face recognition, followed by identity determination and/or classification determination, including ethnic and gender determination. Marker features may form the start of detection and/or validate the detection.

In order to perform face detection, an embodiment such as provided by FIG. 3 provides for a learning based face detection algorithm. In step 210, a training phase is applied where a training set of face and non-face images are collected, and a classification algorithm, such as Support Vector Machines, Neural Networks, or Hidden Markov Models, Adaboost classifiers are trained. The training faces used may accommodate various types of faces or facial markers, including eyes (eyebrows and socket), nose or mouth.

Then, in step 220, the input image is traversed through discrete image elements across at least a relevant portion of the image. When implemented on digital images, this step may be performed by pixel-by-pixel traversal across an image file. At each pixel, a variable size window around the pixel is tested to be face or non-face using the learnt classification algorithm from step 210.

According to an embodiment, a step 230 provides that a detected face is then tested again using a color model to eliminate false positives. The main idea is to reject any face that does not have the same color as skin color. As an example, a skin color model may be implemented in the form of a look up table. The lookup table may include data indicating the probability that a particular color (or pixel) is skin. Different methods exist to construct a skin color model. In one implementation, a histogram of the hue channel may be used on a large sample of skin images. In other implementation, YcrCb or red-green-blue (RGB) color spaces can be used.

According to one embodiment, a new detection confidence may be computed by taking the weighted average (that give more weight for the center part of the face) of all pixels in the detected face region. The final confidence is then the combination between this confidence and the confidence returned from the learnt classification algorithms described above.

In an embodiment, step 240 provides that the face detection may be validated using marker detection. For example, eye detection may be used. Eye detection may be performed within a region of the image corresponding to where the unverified face image is detected as being. This further eliminates false positives. As an example, the relative location of eyes with respect to one another, or the absolute location of individual eyes within the face image, or the confidence of the eye detection, may be used to confirm that a face has been detected.

Marker detection itself may be performed using a training algorithm. For example, a training set of eye images may be used, in connection with a classification algorithm (e.g. Support Vector Machine, Adab0ost), to train an algorithm to detect the presence of eyes. The same type of algorithm may be used for other facial features, such as the nose, mouth, or ear.

According to an embodiment, recognition of persons using facial features may be performed by a method such as described by FIG. 4. As a step 310, a face detection method or process (such as described with FIG. 1) may be performed on a given image.

In step 320, the detected face is normalized. According to one embodiment, normalization involves one or more of the following: (i) scaling each detected face, (ii) providing the detected face with a normalized pose, and (iii) normalizing the effects of lighting. In one embodiment, the scale is normalized into a fixed window size so that different-sized windows of faces can be compared to each other. Pose normalization may be addressed in part by determining the eye locations (or other facial feature). The located eye may correspond to a determination of the eye socket, eyebrow or other part of the eye region. The in-plane rotations are corrected if there is an angle between the eye locations. In one embodiment, a detection method similar to the face detection can be used to detect the eyes.

Normalization of the lighting conditions on the face may be normalized using any one of a lighting normalization technique. In one embodiment, the lighting normalization technique employed utilizes histogram equalization. Histogram equalization translates the distribution of a histogram of a given image to a uniform distribution in order to increase the dynamic range of the given image. Linear ramp, also sometimes known as the "facet" model, is another traditional approach that fits a linear intensity "ramp" to the image by minimizing the error $\|ax+by+c-I(x,y)\|^2$, where x, y are the location of the image pixel I(x,y). This ramp is then subtracted from the image supposedly to remove an illumination gradient and the residual image is then renormalized to occupy the desired dynamic range. Other advanced lighting normalization approaches, such as finding a compact low-dimensional subspace to capture all the lighting variations, and applying a generic three dimensional face shape and approximate albedo for relighting the face image, can be used to normalize the illumination variation.

When implemented, the cropped face image based on the eye location may still contains slight rotation and scale variation. Therefore, the next registration process tries to align the face features to reduce the variation by a generic face model or other component face features, such as nose tip and corners, and lip center and corners. The component face feature classifiers can be trained by standard Adaboost or Support Vector Machine algorithm.

More than one normalization process or sequence may be used to produce a better normalized image. A belief propagation inference can further help to find the miss-detected face component features, as well as adjust the location of the face component features. Other implementations may provide for the use of histogram and Gabor filter response to detect component face features (e.g. such as eye brow, eye socket, nose, lips). In one embodiment, the better normalized face image is obtained by iteratively fitting a generic face template with the perturbation of the eye locations.

Alternatively (or additionally), an advanced technique of normalization includes face feature alignment and pose correction. A component face feature alignment tries to find a two dimensional (affine) transformation by least-square fitting to align the facial feature points with the same feature points on the generic face template. The pose correction consists of two steps. The first is a pose estimation problem, where one goal is to identify the best pose to which the input face image belongs with the highest appearance similarity. The second step is to update the appearance of each face component. The result from the first step is applied to find a set of pre-training images that are expected to appear similar to the specific face component in frontal pose. Then the specific face component is updated by these pre-training face component images to minimize the reconstruction error.

Preservation of skin color may be an issue when lighting normalization is applied. Traditional methods apply lighting normalization based on single image only. The disadvantage is that the skin color information is lost when the normalization is applied on a single person. For instance, a dark skin color, and a bright skin color starts looking same after an illuminization normalization technique. In one embodiment, a lighting normalization can be applied across different people in an image or set of images from an event. First, all the faces are collected from each image. Then, a lighting normalization technique, such as histogram equalization is applied on the collection of faces. This way, the skin color information is retained across different people.

Once the faces are detected, step 330 provides that a recognition signature is determined for each face. One embodiment provides for use of Principal Component Analysis (PCA), or a similar analysis technique, to determine the recognition signature. Initially, a large training set of faces is obtained. The training set of faces may include faces or facial features from people of different races, gender, or hair color. A training set of facial images may incorporate a characteristic for a nose, eye region, mouth or other facial feature. A PCA technique may be applied on this set of training faces, and singular vectors are obtained. Any face in the testing set is represented by their projection onto the singular vector space. This results in a recognition signature ($v_i$) of a particular face.

In step 340, once the recognition signatures (features) are obtained for each face, the faces need to be matched to identities. The matching of recognition signatures to identities is an example of a correlation process. Numerous techniques may be employed to perform this step. These techniques include programmatic, manual or combination techniques. Different correlation techniques are described elsewhere in this application.

In another embodiment, linear discriminant analysis (LDA), or fisher linear discriminant analysis can be used in stead of a PCA technique. Still further, a combination of PCA and LDA can be used. Other embodiments may employ multi-linear analysis (Tensor Face), or alternatively inter and intra face subspace analysis.

In another embodiment, the results of hair, gender, and ethnicity classification, as well as the clothing information, can be also applied as cascade classifiers to improve the face recognition performance. In one embodiment, Support Vector Machine (SVM) can be used to train the gender and ethnicity classifier by a set of labeled face images. Hair detector can be learned by first picking up the histogram of the hair at certain areas above the face, and then the whole hair areas can be detected by iteratively growing the hair region with the similar hair color.

Under an embodiment, the step of detecting a person or face may be performed as an additional step of recognition. If steps 310-330 are performed and the result of the recognition is a bad signature or recognition (e.g. a signature that does not map to a typical recognition value for a person or face), then the result returned as a result of the recognition may be that no face was detected. Thus, the process of detection may actually be a result of the recognition process. Further teachings on detecting text carried on objects in images, and using such text detection, may be found in these references, as examples. "Signfinder". A. L. Yuille, D. Snow and M. Nitzberg. Proceedings ICCV'98, pp 628-633. Bombay, India.1998; "Image Parsing: Unifying Segmentation, Detection, and Recognition". Z. Tu, X. Chen, A. L. Yuille, and S. C. Zhu. Proceedings of ICCV 2003.

While facial recognition can provide recognition with a high level of granularity (e.g. uniquely define or identify the person), other physical characteristics of persons can be used to generate recognition information, particularly when other features are combined with facial feature recognition, and/or when the library of images is relatively small. One type of physical feature of persons that can provide useful recognition information is clothing and/or apparel. Clothing may include the shirt, jacket, sweater, pullover, vest, socks, or any other such item. Apparel may include a hat, eyewear (such as prescription or sun glasses), scarf, purse, backpack, jewelry (including watches) or any other such item worn or carried by a person.

FIG. 5 illustrates a technique for recognizing a person in an image using clothing and/or apparel worn by the person in the image, under an embodiment of the invention. In order to get recognition information from clothing and/or apparel, one embodiment provides that in step 410, a face of a person is detected. As described with FIG. 3, the detection other person may utilize a facial feature, such as the nose, eye area or mouth. In one embodiment, a method such as shown by FIG. 3 is a precursor to performing a method such as described by FIG. 4 and FIG. 5.

In step 420, image data is extracted from a window located a distance from the detected face. The region from which the image data is extracted may indicate the type of clothing or apparel that may be identified from that window. For example, the window may be generated below the detected face, so that the image data will indicate whether the person is wearing a shirt, jacket or sweater. As an addition or alternative, the window may be provided above the face, to indicate what kind (if any at all) of hat a person is wearing. Proportionality, with respect to the size of the detected face in the image, may enable the window to be drawn at regions of the person that indicate waistline or leg area, so that the resulting extracted image data indicates, for example, belts, pants or shorts worn by the person.

In step 430, once the region is identified, image data from the window is quantified, under an initial assumption that the image data corresponds to clothing. In on embodiment, a clothing vector ($c_i$) is extracted from this window. Several methods can be used to obtain a clothing vector. In one embodiment, a color histogram of the clothing region is obtained. Different color spaces can be used for this instance, such as RGB color space, or YUV color space can be used. The histogram bins can be obtained using various methods. For example, a vector quantization algorithm can be used, and a K-Means algorithm can be used to choose histogram centers. In another embodiment, uniform histogram centers can be used. The histogram is obtained by counting the color values in the clothing region towards the histogram bins. In one embodiment, each color value gives a single vote to the closest histogram bin center. In another embodiment, each color value distributes a single vote to all histogram bins proportional to the inverse distance of the bin centers.

As an alternative to step 430, in order to obtain the clothing features from a given image, a K-Means or an adaptive K-Means algorithm may be applied on the clothing image. The K-Means algorithm may need a static input for K, corresponding to, for example, the number of colors expected in the portion of an image containing color. In contrast, the adaptive K-means algorithm starts with a higher K limit and determines from that limit how many colors are in the image. This K color centers may be stored as a representation vector or quantity for clothing. In such an embodiment, an Earth-Mover's distance can be used to match two color features, while comparing the clothing of two individuals. Other techniques also exist to match colors detected from clothing in images, particularly when the colors are detected from one of the K-Mean type algorithms (e.g. when K=2 colors detected). In one implementation, a given color (such as red) may be quantified in terms of how much it occupies in a given window of an image. An assumption may be made that distortion of colors exist, so if there is a matching in quantity of a color in a given window, it is possible for a match to be determined, pending outcome of other algorithms.

While generating recognition information from clothing and apparel may not seem to be indicative of the identity of a person, such recognition information when combined with other data can be particularly revealing. For example, a recognition algorithm may be performed that assumes an individuals clothing will not change, in the course of a set time range, such as over the course of a day, or a portion of the day. Accordingly, if the identity of a detected person is known in one image taken at a given time, any subsequent image taken in a duration from that given time having (i) a detected face, and (ii) clothing matching what the known person was wearing in the image taken at the given time. Clothing information can be advantageous because it is less computationally intensive, and requires less picture detail, as compared to face recognition.

Accordingly, one or more embodiments of the invention contemplate the use of multiple recognition sources in determining recognition signatures or information about persons. As the preceding paragraph illustrates, clothing/apparel and facial recognition may be combined to determine identity of detected persons in a collection of images. The technique of combining multiple sources of information is sometimes called "Double Binding".

With any Double Binding technique, the input to the identity recognition algorithm is digitally captured images, such as photographs captured by consumer-level users. An embodiment contemplates a service that collects images from multiple users over a network such as the Internet, although other implementations may be provided for just a single user running a local program. In the case of photographs from multiple consumers, photographs can be grouped using different metrics, such as the images being part of the same directory, or having a similar timestamp. Similarly, the web photographs can be grouped by the timestamps of the photographs, or the specific web page (URL) or Internet Protocol (IP) address from which the photographs originate from. Once there is a set of pictures, other metrics can be used. Examples of such other metrics include facial recognition, clothing on persons detected as being in the captured images, the time difference between photographs in a given set, the location of where the images in the set where the images were captured, or common text that was identified from the image. Any of these metrics can be applied to identity recognition and/or classification, where a recognition signature or other recognition information is determined for a person in an image.

Figure 6:
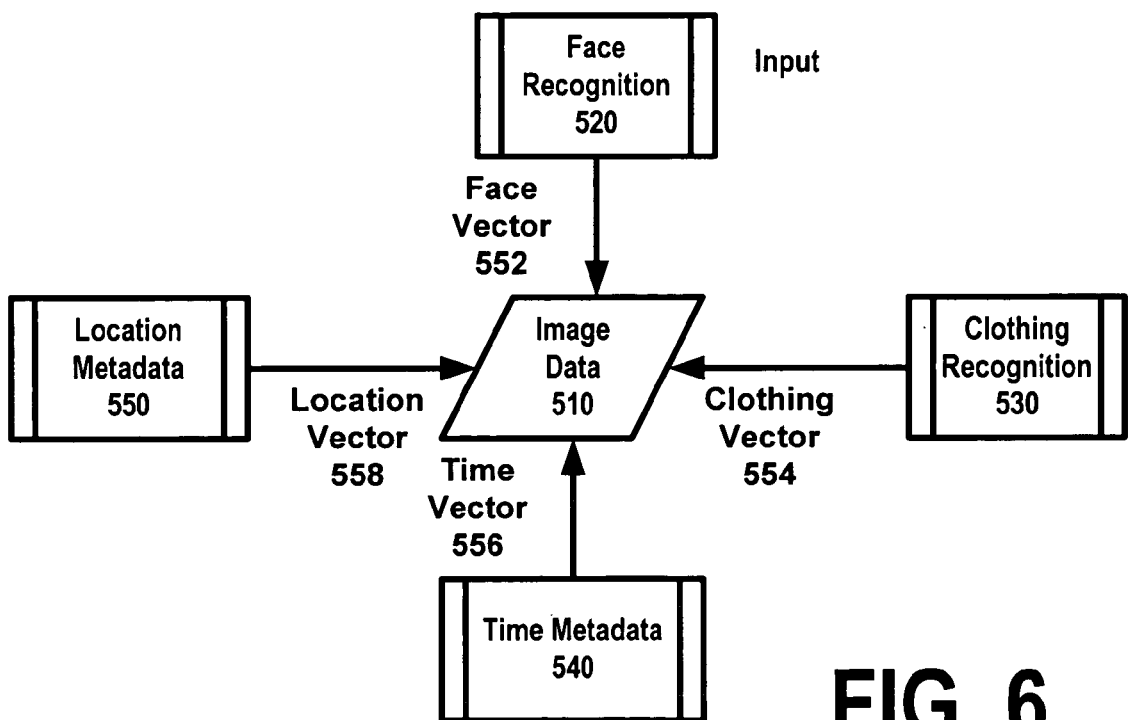
FIG. 6 is a block diagram illustrating techniques for using recognition information from different physical characteristics of persons in order to determine a recognition signature for that person, under an embodiment of the invention.

FIG. 6 is a block diagram illustrating a Double Bind technique for recognizing persons in a collection of pictures, under an embodiment of the invention. Image data 510 from a captured image may be processed by first applying one or more facial recognition process 520. Facial recognition algorithms suitable for an embodiment such as described with FIG. 6 are described elsewhere in this application, including with FIG. 3. While face recognition does not need to be performed first, it does include face detection, so as to be informative as to whether even a person exists in the image. If no person is detected, none of the other processes described in FIG. 6 need to be performed.

As part of performing face recognition process 520, a face detection technique, such as described in FIG. 3, is performed on each photograph in the collection, individually. Then, for every detected face, a facial visual signature $v_i$ is calculated as described elsewhere, including with FIG. 3. The visual signature $v_i$ is used as one of the information sources.

The clothing information is used as another source of information. Accordingly, an embodiment provides that a clothing recognition process 530 employs a method such as described by FIG. 5 may be used to generate recognition information based on the clothing of the person.

Other sources of information for aiding recognition include time information 540 and location information 550. With digitally captured images, time information 540 is contained as metadata with the image file, and it includes the creation time when the image was first captured. In particular, the time/date can be obtained from the header (EXIF) of the JPEG file. In an embodiment, a time vector (ti) is a scalar that represents the time that the photograph is taken. A time difference for two faces can be calculated as $|t_i - t_j|$. This difference vector can be used as a valuable input in assessing the probability of those faces being the same. For example, in a succession of captured images, it is likely that images taken one second apart show the same person. This probability is increased if the person is wearing the same clothes. Thus, facial recognition is not necessary in all cases, particularly when Double Bind technique is employed.

According to an embodiment, processes described above may be used to create a face vector (fi) 552, a clothing vector (ci) 554, a time vector (ti) 556, and a location vector (li) 558. Any combination of these multiple sources of information may be used independently, or in combination (e.g. "Double Binding") for purpose of determining identity or other identifiers of persons.

With regard to location information, some digital cameras, including those that are provided as part of cellular telephonic devices, have started to include location information into the headers of their images. This location information may be derived from GPS data, if the device is equipped with GPS receiver. Alternatively, the location information may be determined from base station information when the device captures images. In particular, with many devices, the location of the base station in use for wireless transmissions is known, and this knowledge may be stamped onto the image file when the image is captured. Location information may be determined in terms of longitude and latitude, particularly when the information is from a GPS device. The location information 558 (li) is also calculated for every image in a collection. This vector contains the longitude and latitude information in scalar forms.

Programmatic Clustering

Programmatic clustering refers to use of programming to sort, categorize and/or select images from a larger set. In one embodiment, images are clustered together for purpose of facilitating users to assign correlation information to the images. One example is clustering images with a common individual for purpose enabling a user to tag all the images of the cluster with a name of the person in the images. This allows the person to tag the name of a person whom he or she has a lot of collections of with just one entry. Clustering may be performed based on characteristics of the image file and of the contents of the image (e.g. recognition signatures and information).

In one embodiment, the time and location information are used to group the photos to clusters (i.e. events). The clusters are then used for identity recognition. Two pictures (i, and j) are declared to be in the same directory, if:

$$|t1-t2|<\text{Threshold1} \quad \text{(criteria 1)}$$

$$|l1-l2|<\text{Threshold2} \quad \text{(criteria 2)}$$

In other words, if images were captured at a time close to each other, and at locations close to each other, the images may then be linked to be in the same cluster. In another embodiment, only criteria 1 can be used to select the images grouped in time. In yet another embodiment, only criteria 2 can be used to group the photographs by location only.

Once the clusters are determined, then the algorithm starts comparing the faces on the captured images. As an example, the algorithm may perform the following comparison while comparing two faces face m, and face n:

If photo of face m, and photo of face n are in the same cluster (event), both face and clothing information are used:
  a. Clothing vector 554 (FIG. 5) difference is calculated:
     $\Delta c = |cm - cn|$
  b. Face vector 552 (FIG. 5) difference is calculated:
     $\Delta f = |fm - fn|$
  c. Then, the final difference vector is calculated as a weighted, linear or non-linear combination of the two, i.e. $d_{mn} = \alpha_c (\Delta c)^\beta + \alpha_f (\Delta c)^\gamma$ If photo of face m, and photo of face n are not in the same cluster or event, then only the face information is used:

$$d_{mn} = (\Delta c) = |cm - cn|$$

The difference vector is used as an input to the recognition algorithm. In the case of unsupervised clustering, the difference vector is used to asses the distance between two samples. As an example, a K-Means algorithm can be used for clustering. As another example, a modified K-Means algorithm can be used.

Programmatic clustering has applications beyond usage for enabling individuals to specify names, email addresses and/or other correlation information. For example, programmatic clustering such as described enables programmatic selection of a set of images for any purpose. As such, it provides an organization tool for enabling individuals to sort and select through images to a degree that is more sophisticated than directory and date sorting available today. According to one embodiment, unsupervised clustering can be used to select sets of images from a larger collection or library. An input to the algorithm is a list of detected faces (identities). For each identity, the system can calculate and/or determine any combination of recognition signature, clothing signatures, time stamp, and event cluster identifier.

In one embodiment, the first step to such clustering is a distance matrix construction. Next, clustering is applied on the distance matrices.

First, the algorithm calculates a similarity matrix. Each (i,j)th entry of this matrix is the distance of identity i and identity j. Such a matrix is symmetrical. In one embodiment, the distance between the identity i and j is a function of the following parameters:

(i) The difference of face visual signatures (SSD used as a metric);

(ii) The difference of clothing visual signatures. This may be used if two identities come from the same event. In that case, the respective signatures are combined using two weights, w_clothing and w_face. These weights are varied by looking at the time difference between the photos. More specifically, $$w\_clothing = \text{Gaussian}(|Time\_i - Time\_j|, time\_standard\_deviation\_constant)$$

The variable time_standard_deviation_constant, may, under one implementation, be chosen to be about one hour. The variable w_face may correspond to (1-w_clothing).

(iii) The time difference between the identities i and j. It is more likely that the identities are same if the time_i and time_j are close. An applicable algorithm uses another Gaussian to additionally weigh the distance by a Gaussian based on the absolute difference of time_i and time_j. The only exception is that if time_i=time_j then i and j can not be the same person.

(iv) A determination as to whether two identities are in the same event or not. If they are, the algorithm can use an additional weight to change the distance (i.e. increase the likelihood that they are the same). This weight can be varied to weigh the event inference more or less.

One technique provides for an algorithmic traversal through every i and j in order to calculate the Distance(i,j) between the identities i and j. After all i and j are traversed, the Distance matrix is ready for clustering.

A clustering algorithm may be based on a distance matrix. An applicable algorithm has three major inputs: (i) Distance Matrix; (ii) Distance threshold, corresponding to a threshold to define when two identities can be put into the same Cluster (k), and (iii) Max Size: maximum number of identities(faces) that a Cluster(k) can get.

In one embodiment, an algorithm applies a greedy search on the Distance Matrix. Such an algorithm may be provided as follows:

STEP-1: the elements of the Distance Matrix are sorted in an ascending order of total sum of distances to the Closest N (a configurable constant) identities. This list is called the traverse list. This way, the algorithm traverses the identities that are closest to other identities.

STEP-2: The algorithm traverses identities in the order given in the traverse list. For the next identity i in the traverse list, the algorithm applies the following steps:

STEP-2.0—if identity i is not already in a cluster, start a new cluster (call it Cluster(k)), and put i in this cluster, and Proceed to STEP-2.1. Otherwise stop here, and go to the next element in the traversal list.

STEP-2.1—Order all the identities with their distance to identity i (ascending order).

STEP-2.2—Go through this list. For the next identity j, put into the same cluster (Cluster(k)) if:
  a—j is not in any of the clusters
  b—if j is closer to all the identities in the Cluster(k) compared to Distance threshold.
  c—The Cluster(k)'s size is smaller than Max Size.

The output of STEP-2 is a list of clusters that are potentially quite densely clustered, due to the order that the lists are traversed.

STEP-3: Do a final pass on the clusters, and calculate the within-cluster-distance of each cluster. Then, order the list of the clusters using the within-cluster distances. This way, the clusters are ordered by their correctness-confidence. One inference that may be used is that people in the cluster are more likely to be the same as the within-cluster distance. This is the order as the clusters are presented to the user. In another embodiment, the clusters can be ordered by cluster size. In yet another embodiment, the clusters can be ordered by a combination metric of cluster size and their within-cluster-distances.

In the case of supervised clustering, the system starts with some training face samples. In one implementation for using training provides that a system matches each image containing a face with the training sample using the distance metric $d_{mn}$ as described above. As an example, a nearest neighbor classifier can be used for this purpose. In another embodiment, an n-nearest classifier can be used. Other embodiments can use Neural Networks, Support Vector Machines, Hidden Markov models.

Once the identities are clustered within each photo cluster (i.e. event), then the identities from multiple events are matched together. For this, only the face information is used, since people tend to change their clothes between different events. If the face vectors 552 of two identities in different clusters look very similar, i.e. $\Delta f$ is smaller than a threshold T, then the clusters of those two faces are assigned to be the same identity.

While an embodiment described above provides for explicit clustering of images, it is also possible to employ recognition techniques, including Double Binding, on digitally images that are not explicitly clustered. In one embodiment, the faces in two different photographs are clustered using a distance metric. As an example, a distance metric may be used that corresponds to a combination of four different measures. For identity (face) m and identity (face) n, the following measures may be calculated:

a. Clothing vector 554 difference is calculated: $\Delta c=|cm-cn|$
 b. Face vector 552 difference is calculated: $\Delta f|fm-fn|$
 c. Time difference 556 vector is calculated: $\Delta t=|tm-tn|$
 d. Location difference 558 vector is calculated: $\Delta l=|lm-ln|$ Then, the algorithm calculates the probability that two faces m, and n are same:

$$P(m,n \text{ are same identity})=P(m,n \text{ same identity}|\Delta f).P(m,n \text{ same identity}|\Delta c).P(m,n \text{ same identity}|\Delta f).P(m,n \text{ same identity}|\Delta l).P(m,n \text{ same identity}|\Delta t)$$

The conditional probabilities are pre-computed using training sets. Then a Bayesian belief network may be constructed among all probabilities between every face m and n. This network uses these probabilities to assign groups of same identities. The groups of identities are provided as an output.

In addition to the various processes, and to Double Binding, another separate technique for recognizing people is relationship inference. Relationship inference techniques rely on the statistics of photographs providing implicit prior information for face recognition. For example, friends and family members usually tend to appear in the same photographs or in the same event. Knowing this relationship can greatly help the face recognition system to reject people who did not appear in some particular events. The relationship inference can be implemented by constructing the singleton and pair-wised relationship potentials of the undirected belief network. In one embodiment, the singleton potential can be defined as the probability of the particular person appeared in a cluster or collection of images (e.g. a virtual "photo album"), and in practice it can be computed by counting how many times this person's face appeared in the labeled ground truth dataset, and, optionally, plus the total mass of "prior experience" that we have. In the same analogy, the pair-wised potentials for the relationship between this particular person and other people can be defined as the probability of this person appeared together with other people in the same picture or the same event. In one embodiment, the standard belief propagation algorithm is then applied to compute the posterior probability of the face similarity to each identity. In one embodiment, the final recognition result is iteratively updated by gradient decent based on the posterior probability.

Person Identity/Correlations

Generating a recognition signature or other recognition information may quantitatively identify a person in an image, but subsequent use of that information may require correlation. Examples of correlation processes include identity assignment (either manual or programmatic), as well as clustering.

Figure 7:
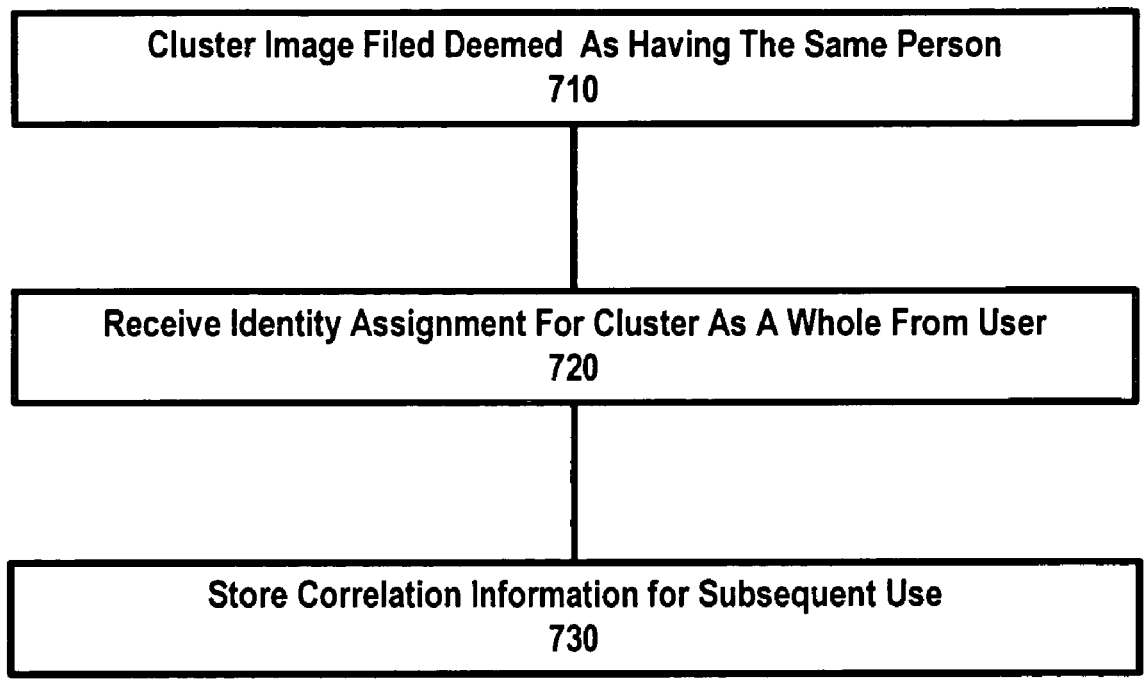
FIG. 7 illustrates a method for correlating an identity of a person with recognition information for that person, under an embodiment of the invention.

In one embodiment, recognized persons may be correlated to identities through a combination of programmatic assistance and manual input. FIG. 7 illustrates a method for performing such a correlation, under an embodiment of the invention. In a step 710, image files that are deemed to contain the same person are clustered together programmatically. Under one implementation, a clustering algorithm such as K-Means clustering can be used to group the similar faces. In another implementation, a greedy clustering algorithm can be used, where each face feature is grouped with up-to n other face features that are closer than a difference threshold.

In step 720, once the groups of faces are determined, the user is asked to assign identities (names) to the groups of faces. For this purpose, the address book of the person can be downloaded from either the person's personal email account, or from applications such as OUTLOOK (manufactured by the MICROSOFT CORP.). Then the user can manually match the faces with the corresponding email address/name pairs from the address book.

In step 730, the correlation information is stored for subsequent use. For example, subsequent retrieval of the image may also include text content that identifies the individual by name. Alternatively, of other image files are captured in which the face is recognized as having the same recognition signature as the individual in the cluster, the identity of the individual is automatically assigned to the person in the image.

Figure 8:
FIG. 8 illustrates an embodiment in which clustering of images is performed programmatically.

FIG. 8 illustrates an embodiment in which clustering of images is performed programmatically. An embodiment such as shown by FIG. 8 may be a result of implementation of a method such as shown by FIG. 7. As shown, a programmatic module or element may programmatically cluster images in which persons are recognized to be the same. Once recognition clustering is performed, identity assignment and correlation may be performed manually, such as through OUTLOOK or other software. In one implementation, names are loaded from an address book on one side (left in the example above), and the images are shown on the other side. The user provides input for matching the photos to the names. In another embodiment, a distributed training framework is used, where some of the address book items are automatically filled using the previously trained email addresses that are kept in a server.

According to another embodiment, recognized persons may be correlated to identities through a training process requiring more manual input and less programmatic assistance. Under such an embodiment, the user provides some number of examples for each person that they want to train the system to correlate and possibly recognize by identity. The training faces may be provided to a programmatic module, such as described with FIG. 12. The module may either determine the recognition signature for persons appearing the set of training images, or recall the recognition signature (if already determined) from a database, table or other programmatic component. Once training is completed, a system such as described in FIG. 12 may analyze all images for which no recognition has been performed for purpose of detecting persons and determining recognition signatures for detected persons. Upon detecting persons and determining recognition signatures, the determined signatures may be programmatically compared to signature from the training set. Matches may be determined when determined signatures are within a quantitative threshold of the signatures of the training set. Thus, matches may not be between identical signatures, but ones that are deemed to be sufficiently close. The user may match the people to email addresses, or other personal identifiers, either while providing the photos, or after he sees the images. The address book from an application such as OUTLOOK or other personal email can be uploaded and shown for this purpose.

Still further, correlation between recognized persons in images and their identities may be established through a combination of unsupervised clustering and supervised recognition. The unsupervised clustering may group faces into clusters as described above. Next, the results are shown to the user. The user scan the results for purpose of correcting any mis-groupings and errors, as well as to combine two groups of images together if each image contains the same identity. The resulting grouping may then be used as the training set to a supervised recognition algorithm. The supervised recognition is then applied as provided in other embodiments.

Among other advantages, combining unsupervised clustering with supervised recognition enables (i) more accurate results, since the algorithm can obtain a bigger training set; and (ii) maintain a relatively low level of manual input, since much of the tedious work is performed programmatically. In other words, the algorithm obtains the accuracy of supervised learning, with minimal work-load on the user.

Recognition of Text on Objects Carrying Text

As mentioned above, another type of object of interest for purpose of detection, recognition, and use is objects that carry text. What is detected and recognized on such objects is text, and not necessarily the object itself. As will become apparent, numerous applications and usages may be assigned to the detection and recognition of text in images.

One application for recognition of text in images is search. Specifically, a search algorithm may include a search of images carrying text that match or are otherwise deemed to be adequate results for a search criterion. Accordingly, an embodiment provides that individual images of a set are tagged and indexed based on recognized text contained in those images. As described below, one embodiment may also filter what text is recognized, based on an understanding of context in which the text of the image appears. As an example, a search on a specific word, may provide as a result a set of images that have that word appearing in the images. Furthermore, a search algorithm such as described may be implemented as an additional process to an existing image search algorithm, for purpose of enhancing the performance of the search.

Context and meaning for detected and recognized words may play an important part in a search algorithm. The meaning of the text in the image can be derived from the text tag, possibly in combination with other sources, which can include: (i) other tags extracted from the image, (ii) the image metadata, (iii) context of the image such as web links pointing to it, directory information on the user file system, file name of the image, content of the web page where the image is displayed, (iv) external knowledge sources such as dictionaries, natural language processing software, and (v) input from the user. The interpretation can then be used to enhance the relevance of the search based on the text found in the image.

As will be further described, related entities can be derived from the text, including: (i) orthographic variations and corrections, possibly based on a spell-checking algorithm, (ii) semantically related words which can broaden the scope of the search query, and (iii) related concepts, products, services, brand names, can be derived from the words to offer alternative search results.

In order to tag images with the text in them, text detection and recognition is applied on each input image. These images could be either on the user's computers, or can be lying anywhere on the internet. Text detection finds the locations of the text in the images. Text recognition uses a normalized image around the detected regions and determines the text that corresponds to the region.

Figure 9:
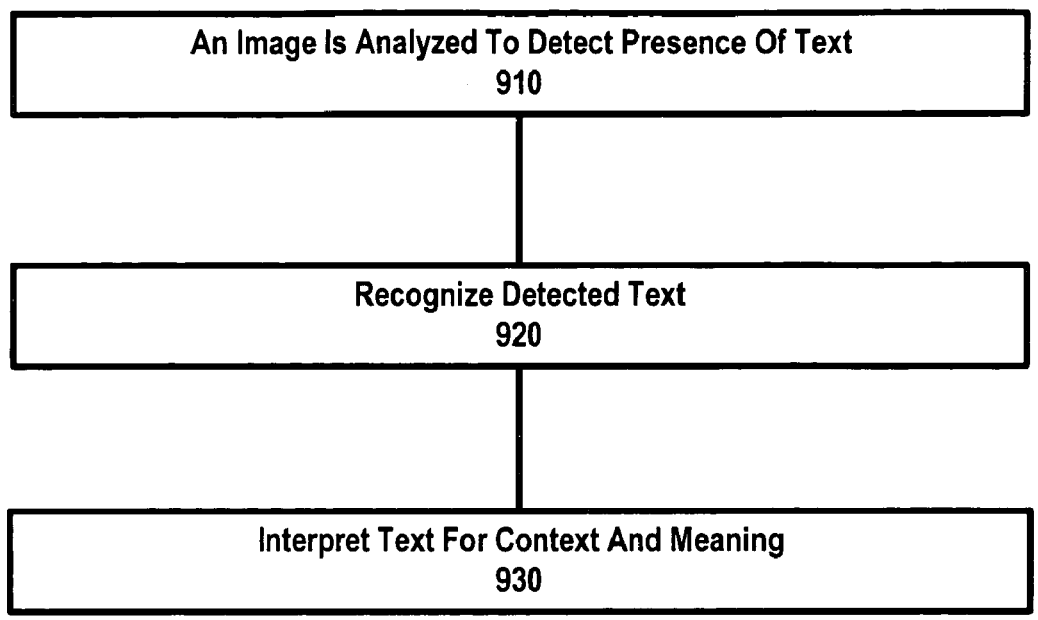
FIG. 9 illustrates a basic method is described for recognizing and using text when text is provided on objects of an image, under an embodiment of the invention.

FIG. 9 provides a description of how text detection and recognition may be performed in a larger context of handling text in captured images. While detecting and recognizing text in images is useful for searching images, other uses for a method of FIG. 9 exist. Among them, the appearance of text may enable users to select portions of the image (as will be described in FIG. 18 and elsewhere) in order to perform on-the-fly web searches, or to be pointed to a specific network location (e.g. web site), or to be presented additional information about the text or text carrying object.

Accordingly, in FIG. 9, a basic method is described for recognizing and using text when text is provided on objects of an image, under an embodiment of the invention. Further, as will be described, not all text encountered in an image is useful. For example, text appearing on a slogan of a t-shirt worn by a person in a picture may not be of use, but text appearing on sign, indicating the name of a business may have commercial use in an online library. Embodiments of the invention further enable programmatic distinction of when text appearing in images is relevant or useful, and when it is best ignored.

According to an embodiment, step 910 an image may be analyzed to determine the presence of text. The text may appear on another object. This step may be performed independently of, or at the same time as analysis of the same image for facial or physical characteristics of persons. According to one embodiment, text detection can be performed using a two-stage technique. The technique may include training stage, and a testing (detection) stage. The training stage is used to train a classifier on how the text looks. For this reason, a training set of text regions and non-text regions are provided. The algorithm starts with a list of hypothesis feature vectors $f_i$, and their weights $\alpha_i$. In one implementation, an Adaboost algorithm may be trained to specify which of the features to use and how to combine them.

In one embodiment, $f_i$'s involve lots of edge features in an image. In addition histograms of the intensity, gradient direction, color information and intensity gradient of the image can be used. Each feature $f_i$ produces a weak classifier, and the final classifier is a weighted version of this classifier as given as follows:

$$H = \Sigma \alpha_i f_i$$

The strong classifier H is optimized on values of $\alpha_i$. In other words, training stage learns the optimal combination of the features.

The testing (detection) phase applies these features for every hypothesis of pixel location. If the strong classifier result H is above a threshold T, the region is identified to be a text region, with an associated set of properties such as orientation, confidence, height, and slope.

Figure 10A:
FIG. 10A provide individual examples of features, provided as block patters, provided for purpose of detecting the presence of text in an image, under an embodiment of the invention.

FIG. 10A provides individual examples of features, provided as block patters, provided for purpose of detecting the presence of text in an image, under an embodiment of the invention. The premise in use of block patterns (alternatively called feature filters) is to provide blocks with contrasted regions adjacent to un-contrasted regions, and vice-versa. A set of individual block patterns 1010 are selected to represent shapes or features of individual letters, numbers or other characters. In this way, the block patterns 1010 serve as markers for text, in that when a block diagram is detected, the potential for the existence of text is present. For any given window of pixels (or discrete image portions), the window may be scanned for one or more of the block patterns 1010. A training algorithm (such as Adaboost) may be used to identify a weighting for each block pattern 1010 in the set. A determination of whether a given block pattern exists in an image may result in a statistical based value, which when summed or combined for all block patterns 1010, can be compared against a minimum or threshold value to determine if the window portion of the image contains any text.

As an option, one embodiment provides that once the text is detected, several techniques are applied for post-processing, and pruning detected text regions. Several post-processing algorithms are described.

One post-detection technique is binarization. Binarization refers to conversion of color or shaded text into binary form (e.g. black and white) to, among other reasons, enhance the performance of the OCR. A binarization algorithm may be applied on regions of the image detected as having text. As an example, an adaptive binarization algorithm can be applied. For every pixel, the mean ($\mu$) and standard deviation ($\sigma$) of a window around that pixel is calculated. The pixel is binarized accordingly with a threshold. In another implementation, an unsupervised clustering algorithm is used adaptively on the color image (with or without gray level conversion). A K-Means algorithm can be used with a k value of 2. This algorithm would divide the region into multiple, possibly overlapping regions including: dark text foreground, light text background, light text foreground and dark text background.

Next, if necessary, text stretching may be applied to the detected text. In text stretching, a portion of a word is detected. When the text is detected, a programmatic element knows that additional text may be located in the image along a path or line defined by the text already detected. For example, FIG. 10B illustrates how detection results, in a portion of the term "animal", and stretching identifies the remainder of the term. FIG. 10C illustrates how a portion of the term "Boutique" is located, and because part of the word is found, the system knows that the remainder may also be present. Both examples provide an example of a linear path for which image data may be inspected for the presence of text.

According to one embodiment, connected components of the detection regions are found. These are supposed to be the letters or connected letters. The components are grouped together by relevance to their distance in between, to their shapes and heights. In one implementation, a slope of grouped connected components is calculated by fitting a line to the centers of the grouped components. A least square fit, or a weighted least square fit algorithm can be used for this purpose. Then the text may be extended in the direction of the slope in both sides. The text box is extended in the direction of the slope for this reason. The text is not extended if the regions beyond the detected text do not match text-like attributes such as high variance, existence of letter-like connected components, consistency of the foreground color with the detected text.

In one post-processing implementation, the text can then be re-binarized based on global attributes of the text region, including average size of the letters, spacing, foreground color, type of font used, and possibly a first attempt at recognizing the text using OCR (see section below). The text regions can then me merged into complete lines of text based on their alignment with respect to each other.

Furthermore, the regions can then be corrected for orientation, skew, slope, scale factor and contrast yield and image containing black text on white background, of a consistent average size, and aligned horizontally, which is the preferred format to perform OCR. FIG. 10D illustrate specific examples where detected text appears in a skew or slanted orientation, and then is processed so as to be re-oriented to be more planar with respect to the two-dimensional orientation of the image.

Following text detection, step 920 provides that the detected text is recognized. The recognition information generated from recognizing such text may be in the form of a set of alphanumeric characters. More than one set may be recognized for the same image, with each set representing guesses of characters or numbers with various levels of confidence. As input for performing this step, the detected and binarized text region is used as an input to an OCR algorithm. Any OCR algorithm and package might be used for this purpose. The output of this stage is text that corresponds to the detected text region, along with a set of attributes which are typically produced by the OCR, including but not limited to: font, alternative candidate letters, bold/italic, letter case, character confidence, and presence of the word in the OCR dictionary. These features may be used to assess the confidence in the output text.

In one embodiment, text detection and OCR can be used jointly, for example using an iterative process where the text detection first performs a crude segmentation of the image, and OCR then identifies likely text regions. The likely text regions are passed to the text detection and normalization to be refined, and sent back to the OCR as many times as necessary to obtain a final text recognition result. In another embodiment, multiple binarization outputs can be produced using different binarization thresholds, and the output with the most OCR confidence can be used as the main output.

In step 930, the text is interpreted, so as to provide context or meaning. For example, when recognition yields a string of characters, step 930 may interpret the string as a word or set of words. In performing this step, one embodiment may utilize confidence value generated by an OCR algorithm or application. In one embodiment, the letter with the highest confidence is chosen as the final letter. However, such a method may be prone to errors, since some letters look similar to each other. In order to deal with this issue, other context information can be used for word recognition.

In one embodiment, a dictionary assist can be used. The words that are not in a dictionary can be eliminated/corrected using the dictionary. A finite automate state machine can be used in order to implement the dictionary.

Still further, another embodiment may use language modeling techniques such as n-grams. These techniques would calculate the probability that a letter is followed by (n-1) other letters. For every letter i ($l_i$) in a word, the following probabilities would be calculated:

$$P(1_i|1_{i-1},1_{i-2},\ldots,1_{i-(n-1)})$$

which is the probability that letter i is followed by letter i-1, . . . ,i-(n-1). In a tri-gram, the following probability is calculated for every letter in a word:

$$P(1_i|1_{i-1},1_{i-2})$$

Then the word probability can be calculated by the multiplication of the probabilities of every letter in the word. For instance, the probability of the word WORLD, is given as:

$$P(WORLD)=P(W|\#).P(O|\#W).P(R|WO).P(L|OR).P(D|RL)$$

Then the words with not enough probability can be eliminated. The technique of n-grams is especially useful for proper nouns, since the dictionary assist technique would have eliminated the proper nouns.

In another embodiment, the set of features extracted from the OCR, possibly in combination with the language model and dictionary can be combined using a regression or classification technique to compute the probability of the word sequence to be correct. An instance of this method uses a linear classifier, which linearly combines the set of numeric values associated with each feature to produce a confidence score. This linear classifier can be trained from data using Linear Discriminate Analysis. Non-linear classifier such as Neural Networks or Support Vector Machines can also be used. The confidence score can then be mapped to a posterior probability of being correct using a ROC curve computed from training data.

In another embodiment, multiple OCR systems are used to contribute to the final output. Each OCR engine is given a text detection output, possibly using different text detection and normalization parameters, and produces its own hypothesis or set of hypotheses as to what the text is, and an associated confidence measure. These outputs are then combined to produce a single final output and posterior probability using a model combination technique. Possible model combination techniques include: simple voting, confidence voting, ROVER and Bayesian Model Combination (BAYCOM).

Once text is detected, recognized, and placed in context, a type of correlation may be performed in order to use the image for the text in a particular context. A step of determining context may be performed as an additional, intelligent step of interpretation. One goal of interpretation is to establish the level of relevance of the recognized text to a particular task, function or use. For example, a large sign saying "WELCOME TO SAN FRANCISCO" on a photograph is relevant in determining the location of the event. A small street sign saying "NO PARKING" in the background of the picture might not be relevant to any search query. To establish a measure of relevance, several cues can be used, including but not limited to: the semantics of the text, the text location, size, contrast, and sharpness of focus. Dictionaries and thesauri can be used to determine the possible semantic classes the text belongs to (for example a city database is useful in determining that "San Francisco" is a city name, hence relevant as a location tag).

With regard to text, various implementations of correlating and using the recognized text data exist. According to one embodiment, images may be tagged, indexed or otherwise associated with metadata that corresponds to the text contained somewhere in the image. Among other applications, an index or other form of tag representing recognized words may provide a searchable structure in which search criteria is matched to images based on text carried on objects in those images.

Text correlation also lends itself to applications that utilize the text recognized in the images. Once the text is found in each image, that image is tagged (indexed) with that tag. Additional techniques (such as described below) may be used to create more tags in each image and neighboring images.

One such embodiment provides for an extrapolation technique, which can be used to find tags and relate those tags to different characteristics of other images, including text contained in those other images. For instance, if a text content "San Francisco" is programmatically identified from an image, then an embodiment may provide for the determination and association of additional relevant tags to the recognized text content. For example, in the case where the recognized text is "San Francisco", related tags associated with that term include "Bay Area, California", and "USA".

One text extrapolation technique may provide for a build of a database, table, or other relational data structure which relates a recognized text with other words, names or phrases. For example, a database may be built which associates individual words in a library of potentially recognized words with other relevant words. Thus, for example, a database may be provided which relates potentially recognizeable words with one or more other relevant words. As an example, a database may be built based on locations, restaurants names, hotel names, yellow pages.

Another extrapolation technique may be referred to as tag spanning. Tag spanning adds an additional dimension of relation when correlating text recognized from images to other image files. In tag spanning, a text or other tag found on a particular image may be applied to other images that are relevant to that particular image, where such relevance is based on a parameter or factor other than recognized text content. For instance, if the text San Francisco Hilton Hotel was found in one of the images, the same tag can be assigned to pictures that were taken around the same time-frame. Thus, the first step in determining relevance is based on a timing parameter, not on whether the images contain a particular text content. The time-stamp information can be obtained from the EXIF (header of an image file containing metadata) of the image. Similarly, the same tag can be applied on pictures that were taken at a similar location. The location (GPS) information can also be obtained from the EXIF of the image.

In an embodiment, a database of spannable words may be constructed, where spannable words are meant to include words that can be determining to have a meaning or content to them. For instance, the word "the", or "Budweiser" may be considered not spannable, whereas the location names, or proper names of businesses (such as restaurant names and hotel names) are spannable. Tag spanning assures that all relevant images are tagged with extracted tags.

Figure 11:
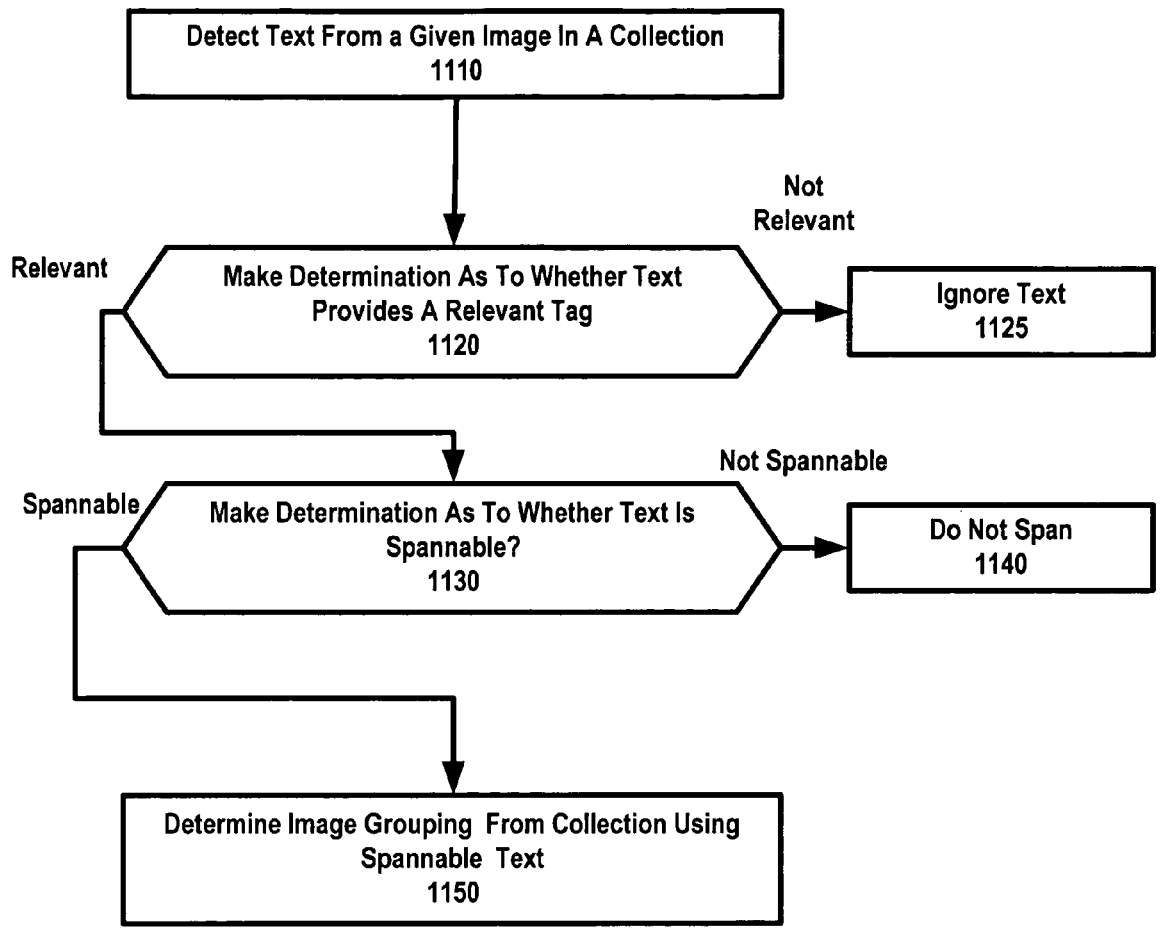
FIG. 11 illustrates a technique in which a detected and recognized word in one image is then spanned across a set of images for purpose of tagging images in the set with the recognized text, under an embodiment of the invention.

According to an embodiment, tag spanning techniques are employed in connection with programmatic intelligence for determining what words are spannable. FIG. 11 illustrates a technique in which a detected and recognized word in one image is then spanned across a set of images for purpose of tagging images in the set with the recognized text, under an embodiment of the invention.

Initially, in step 1110, text is detected from a given image in a collection of images. No determination of a set of images may yet be made for purpose of spanning. Next, step 1120 provides that a determination is made as to whether the text provides a relevant tag of the source image. The outcome of the determination may be based on the meaning of the detected text, as well as other factors that may include any of the following: (i) an identification or understanding of the object that carried the text in the image; (ii) the size or placement of the text in the source image; (iii) the format or font of the recognized text as it originally exists in the image; (iv) other information recognized or determined from the source image, including metadata such as the time of the image being captured of the location where the image was captured, as well as recognition of people or other objects in the image. If the determination in step 1120 is that the text does not provide a relevant tag, then step 1125 provides that the detected and recognized text is ignored, and other text from the same image or other images in the collection are used. As an alternative, the text can be tagged in the image, but not recognized as a spannable text.

If the determination in step 1120 is that the text does provide a relevant tag, then step 1130 provides that a determination is made as to whether the text is spannable. Spannable text corresponds to text that is (i) carried in one or more images of a set, and (ii) is relevant to other images in a set of images as a whole. For example, text describing or indicating a location in one image of the set can be relevant to all images in the set in that it indicates the location where all images in the set were taken, regardless of whether the particular text actually appears in anymore than one image in the set. In general, spannability of text is determined using the relevance determination, including applying recognized text to semantic classes such as locations (e.g. landmarks, cities, countries) or events (wedding, party, holiday). Relevance scores may be generated based on a threshold is applied to the relevance score of the text to determine whether or not to use it for spanning.

If the text is determined to not be spannable, then step 1140 provides that the detected text is ignored for purpose of spanning. However, the text may still be used to tag the source image as a relevant text.

If the text is determined to be spannable, then step 1150 provides that a set of images are determined from the collection that can be spanned by the identified text. As mentioned, the grouping of images from the collection into the set may be based on a factor other than text content. Rather, images in the set may be determined to be relevant to one another based on some other characteristic of the images. In one embodiment, the factor that determines relevance among images in the collection is at least one of (i) the time when an image was captured, and (ii) a location where the image was captured. any spannable tag is spanned along a timeline or duration of time. Given an image with a spannable tag, the system looks for other images in the same album and computes a "spanning weight". In one embodiment, the weight is a Gaussian $G(t,t0,s0)$ where t and t0 is the timestamps of the second image and the original image (image with tag), s0 is the standard deviation for degrading. A slight modification includes a cut-off if the image is beyond $n*s0$ of the original image (i.e. $|t-t0|>n*s0$). The weight then is multiplied to the confidence of the original tag and become confidence of the spanning tag. If the image already has the same spanning tag that came from a different image(s), the spanning confidence can be combined as a function of two confidences and the timestamps of two source images. In another embodiment, a linear ramp weighting can be applied instead of a Gaussian fall off.

As a result of step 1150, a set of images in a collection may be tagged with metadata that corresponds to the detected and recognized text from just one image in the set. Additionally, an embodiment provides that the detected and recognized may be extrapolated, and extrapolated data may be spanned across the identified set of images in the set. Thus, if an image contains text referencing the name of a well-known business or establishment in a given city, the text may be extrapolated to the name of the city, the type of business or establishment that the text identifies, and alternatives to the particular business or establishment made by the identified text. So were all of these text items may be tagged on each image identified in step 1150.

System Description

Figure 12:
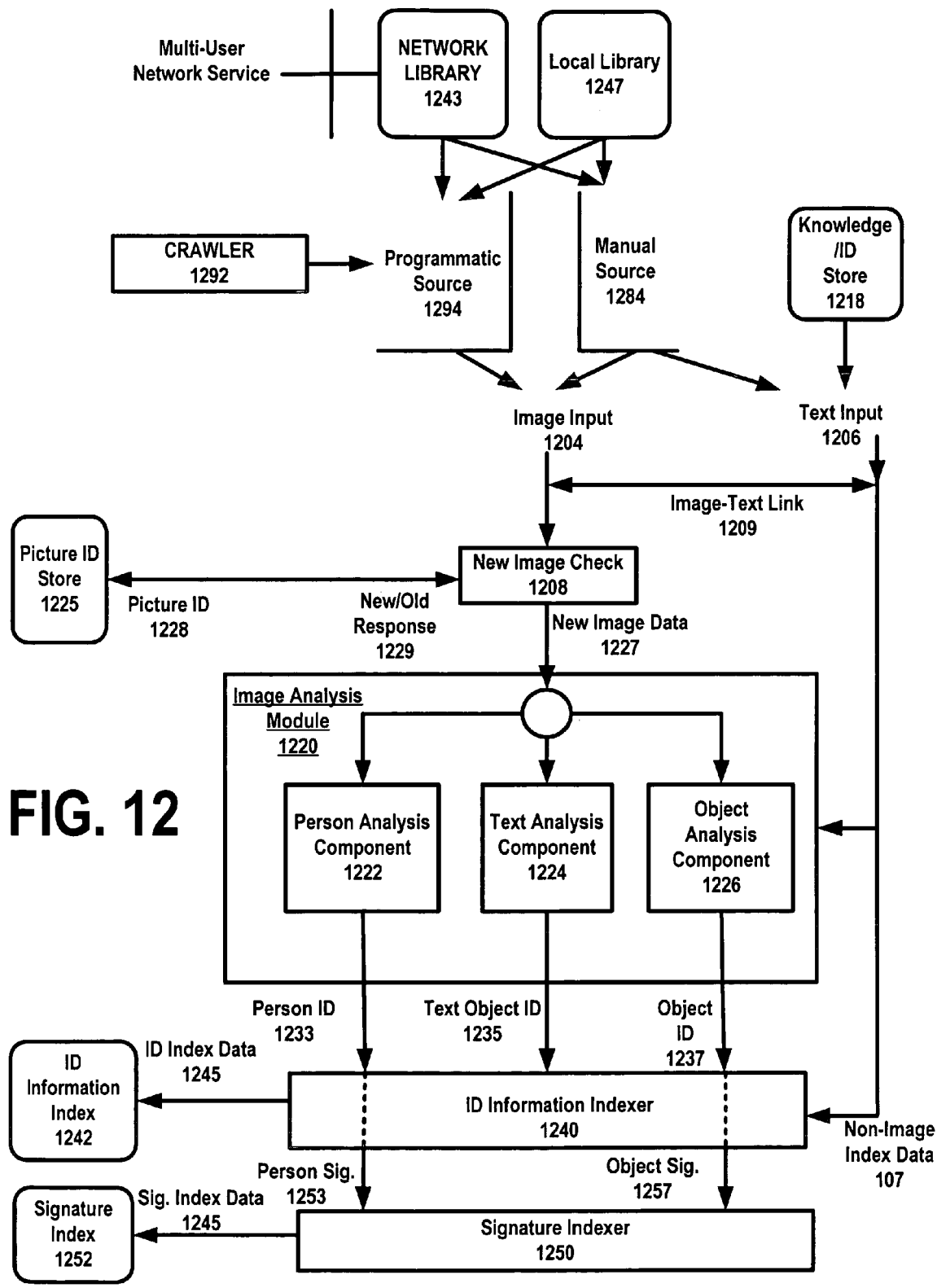
FIG. 12 illustrates a system on which one or more embodiments of the invention may be performed or otherwise provided.

FIG. 12 illustrates a system on which one or more embodiments of the invention may be performed or otherwise provided. As with any other system described herein, a system such as described by FIG. 12 may be implemented in whole or in part on a server, or as part of a network service. Alternatively, a system such as described may be implemented on a local computer or terminal, in whole or in part. In either case, implementation of a system such as shown requires use of memory, processors and possibly network resources (including data ports, and signal lines (optical, electrical etc.). In particular, an embodiment such as shown by FIG. 12 may be used for purpose of analyzing images and recognizing objects, as well as building an index based on recognition of objects in the images. A system includes image analysis module 1220 that analyzes images that recognizes objects appearing in the images. The image analysis module 1220 is configured to generate recognition data of different types of objects appearing in individual images for purpose of enabling the recognition data to be indexed. Indexing enables functionality such as search and categorizing or sort. Thus, one embodiment provides that the image analysis module 1220 recognizes object from image data for purpose of enabling those object to be the subject of searches, whether performed manually by users, or programmatically by software.

In an embodiment shown by FIG. 12, two types of indexes are supplied with data and information determined from the image analysis module 1220. An Identifier Information Index 1242 may use correlation information as its index data element. The correlation information may be in the form of text data, such as the proper names of person in s recognized, toward determined from recognized tax carried on an object, or an identification for what an identified object is. A signature index 1252 uses numeric or quantitative signature data that substantially uniquely identifies a person or object. For example, signature index in 1252 may store data that will enable a determination that two separate digital images contain the face of the same person, but information corresponding to the name or identity of the person may be maintained elsewhere outside of this index. The use of separate indexes to maintain identifiers based on correlation information and quantitative recognition signatures is a design implementation to facilitate numerous types of functionality, including text searching for images, image search for images, and similarity or likeness searches (described in more detail below). Other implementations may also provide for ID Information index 1242 and signature index 1252 to share information, or otherwise be linked so that recognition signatures and information are provided with identities.

Image analysis module 1220 includes a person analysis component 1222, a text analysis component 1224, and an object analysis component 1226. The person analysis component 1222 may analyze image data from a given image file for purposes detecting and generating recognition any person appearing an image. As described elsewhere, the detection and recognition of persons may be based on the presence of facial features, clothing, apparel, other persons recognized or otherwise known to be in the image, or other recognitions of persons made from other images related (by, for example, time and/or geography) to the one being analyzed. When a person is recognized from an image, recognition information corresponding to in identifier of that person may be outputted by the image analysis component 1220.

In one implementation, the identifier of the person generated from the person analysis component 1222 is a recognition signature 1253, meaning the identifier substantially uniquely identifies the person from other persons. The recognition signature 1253 may be supplied to a signature index 1250.

The person analysis component 1222 may also be configured to retrieve correlation information corresponding to the identified and/or recognized person of a given image. This correlation information may, for example, be the proper name of the individual. The person analysis component 1222 may have access to a correlation database (not shown) which provides the proper name or identifier of the person, or the information may come from knowledge store 1218. Alternatively, user input may be used to determine the identifier of the person recognized from a given image. Other examples of the identifier of the person may correspond to a class or group of the person. As such, the correlation information may be in the form of a person identifier 1233 that is supplied to this ID Information Indexer 1240.

The text analysis component 1224 detects the presence of text in an image under analysis. As described with FIG. 9, text analysis component 1224 may make a determination as to whether the text is material and/or relevant to the image under analysis. Furthermore, as described with FIG. 11, the text analysis component 1224 may perform functions of extrapolating and spanning. An output of the text analysis component 1224 is text object information 1235. This information may correspond to words or other text data that is recognized from the image under analysis, or extrapolated from another recognized word. When spanning is used, the text object information 1235 may be associated with the image under analysis and any other image determined to be in a relevant set of the image under analysis.

The object analysis component 1226 may perform detection in recognition of objects other than persons or text. Examples of other objects that can be recognized include: landmarks, animals, geographic localities, structures by type (e.g. church or high-rise) or by identity (e.g. Taj Majal), and vehicles (e.g. by type or by manufacturer). The object analysis component 1226 may employ different recognition processed for different types of objects, as well as for different types of environments for which the recognition is to be applied from. The recognition of objects in real-world scenes is a complicated task for a number of reasons. Some of the issues presented with recognizing objects include intra-category variation, occlusion, three-dimensional pose changes, and clutters.

One approach for recognizing certain types of objects is to model objects as constellations of localized features. According to one embodiment, a set of training images is collected for each type of object that is to be recognized. Once the training set is collected, a corner detector is applied to obtain the salient local features for each object. The representation of these local features can be the filter response from, for example, a Gabor wavelet, SIFT, spin image, or other recognition technique. The local features can be further condensed by clustering. The representation of local features is in-sensitive to small changes of scale, pose, and illumination. The affine-invariant features can also be computed to handle large pose variation.

During a test stage, one embodiment provides that the recognition process simply computes the similarity between the local features for each registered object and the local features for the given test images. In another embodiment, the shared feature clusters activated by the local features of the test images can be used to vote for the object hypothesis. In addition, the object recognition process can be integrated with segmentation and evaluated by the belief network jointly and efficiently.

The ID information Indexer 1240 may receive correlation information, such as in the form of text data that identifies what a recognized object is. For example, a picture with the landmark of the Eiffel Tower may be recognized and correlated to the proper name of that landmark, in this data may be supplied to the ID information indexer 1240 as object identifier 1237. At the same time, a quantitative or numerical representation of the landmark may be supplied to the signature indexer 1250.

According to an implementation shown by FIG. 12, each of the indexers supply their own respective index. The ID Information Indexer 1240 submits ID index data 1245 to the ID Information Index 1242. The Signature Indexer 1250 supplied Signature Index Data 1255 to the Signature Index 1252. Each of ID index data 1245 and Signature Index 1252 enable specific types of search and retrieval operations. For example, ID index data 1245 enables retrieval of images based on text input. For example, a user's search criteria of a proper name will return images that have been recognized to containing the person with the same name. This operation may be completed using the ID Information Index 1242 as a source. A user's search criteria of an image of a face may return images containing the same face. This operation may be performed by (i) recognizing the face in the image that is to serve as search input, and (ii) retrieving an image with the same or equivalent recognition signature using the Signature Index 1252 as a source. As will be further described, in the other type of functionality provided is similarity matching. For example, Signature Index 1252 may be used in comparing this signature of an input image with the signature of other images stored with signature Index 1252 for purpose of determining similar recognition signatures. Similar recognition signatures may yield any of the following: (i) individuals who look-alike based on the similarity comparison threshold; (ii) identification of individuals from a class (e.g. celebrity class) who look-alike a given person, identified by name (using ID Information Index 1242) or identified by image; and object/person similarity matching. In the latter case, a person may be matched to an animal, such as a dog, as a quantification of his or her resemblance to that animal.

The image analysis module 1220 may receive image input from a variety of sources. According to one implementation, image analysis module 1220 is part of a network service, such as available over the Internet. Accordingly, image analysis module 1220, ID information indexer 1240, and signature indexer 1250 may be server-side components provided at the same network location, or distributed over more than one network location. For example, one or more of the indexes may be provided as a separate service, and at a separate Internet web site than the image analysis module 1220. Alternatively, image analysis module 1220, as well as any of the indexers, may be local or client side components. With regard to the source of images in particular, images may be provided from an image capturing device, such as a digital camera, or through user-controlled devices and/or client terminals. Specific types of clients include image capturing and/or display applications that run on, for example, laptop and desktop computers, and/or combination cellular phone/camera devices. The location of the individual components may influence the type of input that can be handled by the system.

The sources for images that are indexed maybe programmatic, manual, or a combination. A manual source 1284 may be provided to enable users to manually enter image input 1204. Image input 1204 may correspond to images submitted by a user for recognition and indexing, as well as images that are intended to be input for purpose of searching or similarity matching. For example, the image input 1204 may correspond to (i) one or more image files transferred from a digital camera device (e.g. wireline transfer from digital camera to desktop computer, or cellular transfer (via email or Multimedia Messaging Service (MMS)) from combination device to the desktop computer), (ii) receive and opened via e-mail or other network service, (iii) downloaded from the Internet, or (iv) designated as being in a folder residing on a machine used by the user. In the latter case, the folder may be part of a local library 1247 or part of a network library 1249. As described in other embodiments, image input 1204 may also be provided as responsive input in the form of a selection of an object in an objectified image rendering 1910 (see FIG. 18 and FIG. 19). The manual source 1284 may also provide text input 1206, that serves as correlation information for a particular image. For example, text input 1206 may correspond to the proper name of a person, which can then be used with the person analysis component 1222.

As described with embodiments in which correlation is described, the user may link text input 1206 with image input 1204. Such link information 1209 that links text input 1206 with image input 1204 may be carried as metadata, and supplied to, for example, the ID information indexer 1240.

Another source for text input 1206 is knowledge store 1218. For client use, knowledge store 1218 may correspond to an address book, such as provided through OUTLOOK. On a network service, knowledge store 1218 may correspond to a directory of names, or object identifiers. In some implementations, programs such as OUTLOOK may carry pictures of contacts, and the picture may be carried as image data to the signature indexer 1250. Regardless of the source of text input 1206, the text input may be used for correlation purposes. For example, an unrecognized image may be given an identifier in the form of text input 1206, either from the user or from the knowledge/ID store 1218. The identifier may be carried to the ID Information Indexer 1240, where it is indexed with the recognition signatures and/or information generated from the image. Another use of text input 1206 is to provide feedback as to whether recognition is correctly done for a given person, text or object.

In addition to manual source 1284, programmatic sources 1294 may be employed in some embodiments for purpose of obtaining image input 1220. Programmatic sources 1294 include programs or applications that gather images substantially automatically. In one implementation, the programmatic source 1294 is used to update indexes maintained by an online service, such as an image search engine available to Internet/network users. In such cases, for example, the programmatic source 1294 may include a crawler 1292 that crawls web sites for images, or crawls through directories of users for images. In another implementation, users of the service may access submit image files or folders, and the programmatic source sequences or otherwise prepares the image files for processing by the image analysis module 1220. In still another implementation, the programmatic source 1294 may be a local or client side agent that retrieves images automatically (or with some user input) for use by image analysis module 1220. Various alternatives, variations and combinations are also contemplated for the programmatic source 1294, manual source 1284, and the location of those and other components of a system described with FIG. 12.

Regard to any of the implementations or embodiments described, any image input 1204 may be processed, as an initial step, to determine whether that particular image was previously analyzed and recognized by image analysis module 1220. In one embodiment, a component labeled new image check 1208 makes an initial inspection of an image file to determine whether the image file has been handled by the image analysis module previously. The initial inspection may be performed by way of an analysis of metadata contained in a header of the image file or otherwise associated with the image file. From the in one implementation, new image check 1208 extracts metadata 1223 from the header of the submitted image file, and checks the extracted metadata against a picture ID store 1225. If the image file has never been analyzed before, metadata 1223 is stored in the picture ID store 1225. If the image file has been analyzed before, new image check 1208 omits forwarding the image file to the image analysis module 1220. In this way, a response 1229 from the picture ID store 1225 results in either the image file being ignored/discarded (for processing purposes), or analyzed.

Figure 13:
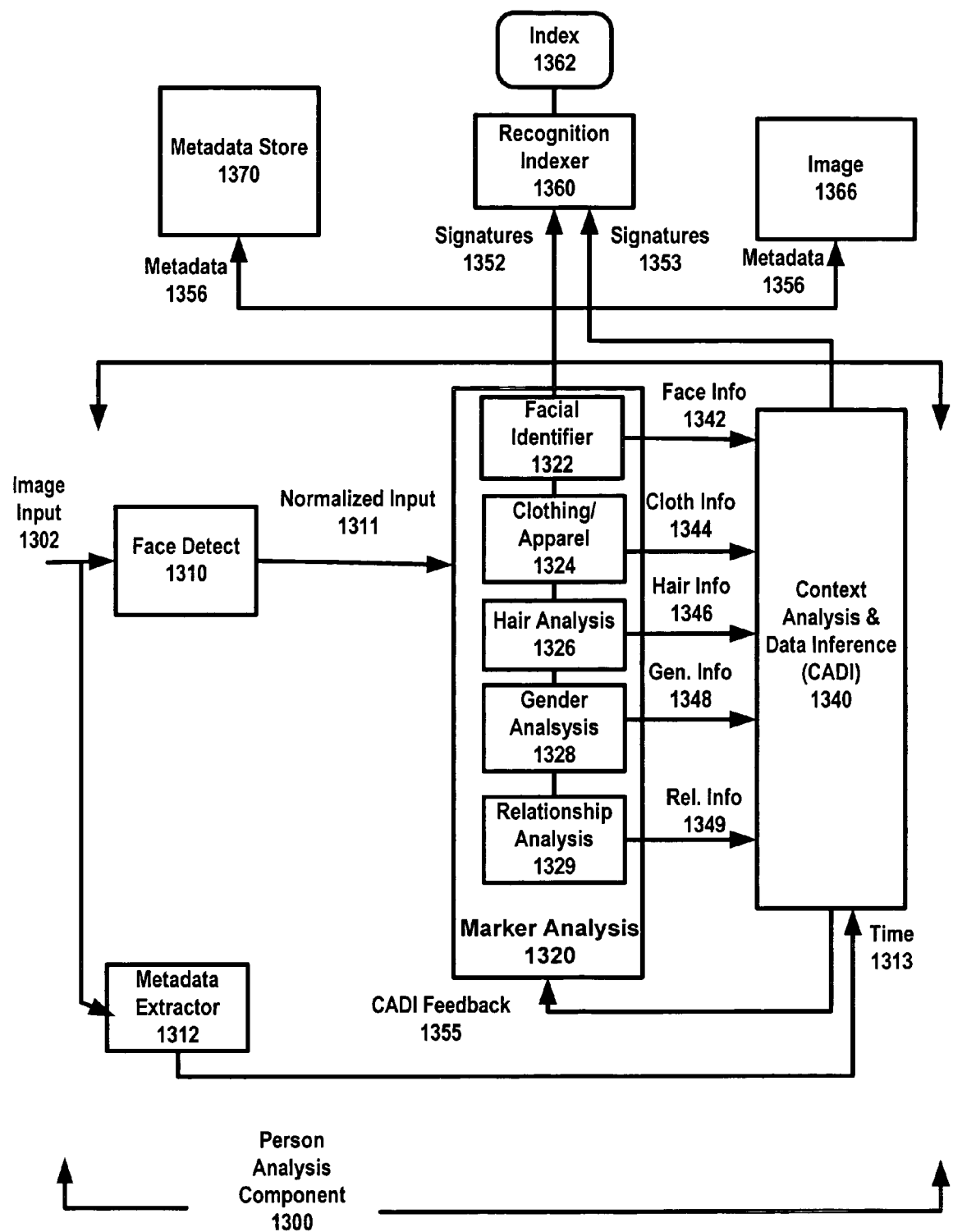
FIG. 13 illustrates person analysis component for use in embodiments such as described in FIG. 12 with greater detail, under an embodiment of invention.

FIG. 13 illustrates person analysis component 1220 in greater detail, under an embodiment of invention. In an embodiment shown by FIG. 13, a premise for performing recognition is that a substantial number of markers, other than face appearance information, are present in user photographs. A system such as shown is configured to exploit these non-facial markers (or other recognition clues) for purpose of improving the recognition performance of the system as a whole. Some of these markers, such as clothing and apparel, have been described in detail in other embodiments. Additionally, FIG. 13 illustrates different techniques, image markers, and information items in order to assemble recognition signatures and information, as well as identity correlation.

Accordingly, a person analysis component 1220 may include a face detect component ("face detector") 1310, a metadata extractor 1312, a marker analysis module 1320, and a Content Analysis and Data Inference (CADI) module 1340. Image input 1302 may be received by face detector 1310 and metadata extractor 1312. The face detector 1310 may detect whether a person is present in the image. Additionally, the face detector 1310 may normalize image data of the detected person for use in recognition processes that are to be performed by the marker analysis module 1320. Normalized input 1311 may be provided from the face detector 1310 to the marker analysis module 1320. In one embodiment, the metadata extractor 1312 identifies metadata indicating creation time of the image input 1302. Time input 1313 is submitted by metadata extractor 1312 to the CADI module 1320.

The marker analysis module 1320 may comprise of several recognition components, each of which use a particular marker or characteristic to recognize a person. In one embodiment, marker analysis module 1320 includes a facial identifier 1322, and one or more of the following components: a clothing/apparel component 1324, hair analysis component 1326, a gender analysis component 1328, and a relationship analysis component 1329. Relationship analysis component 1329 may (alternatively or additionally) be part of CADI module 1340, as it relies on inferences to an extent. Each of these components may be configured to generate recognition information specific to a person detected from image input 1302. Recognition information from some of these components, including facial identifier 1322, maybe the form of a signature, with substantially uniquely identifies the person in the image input 1302. Other components, such as gender analysis component 1328, may only provide recognition information that is less granular in identifying person in the image input 1302, as compared to recognition signatures.

The CADI module 1340 may receive recognition information from each of the components of the marker analysis component 1320 for purpose of providing an identity and/or correlation to the person appearing the image input 1302. In particular, facial identifier 1322 may provide face recognition information 1342. Face recognition information 1342 may be provided in the form of a signature, which is uniquely or substantially uniquely identifying of that person. The facial identifier 1322, independently or in connection with face detector 1310, may execute processes in accordance with methods such as described in FIG. 4 for purpose of generating recognition information based on the face of the person. The clothing/apparel component 1324 may provide clothing recognition information 1344, as described with a method of FIG. 5 and other embodiments. The hair analysis component 1326 may provide a hair recognition information 1346, including color, length or hair style. The gender analysis component 1328 may provide gender recognition information 1348. Furthermore, relationship analysis component 1329 may provide relational recognition information 1349.

In such an embodiment, the marker analysis module 1320 communicates signatures and recognition information to the CADI module 1340, and the CADI module 1340 performs inference and correlation analysis to provide CADI feedback 1355 to the person analysis module 1320. In providing feedback 1355, CADI module 1340 may receive the different recognition information and draw inferences that indicate whether the components of the marker analysis component 1320 are accurate. In particular, the CADI module 1340 may provide feedback 1355 in the form of (i) confidence indicators that the recognition information is correct, and (ii) feedback that the recognition information is either incorrect or should have a particular value. In this way, the feedback 1355 may be used by the facial analysis component 1322 to promote accuracy, either by itself or in combination with other components. The CADI module 1340 may perform analysis of recognition information on more than one image, so as to perform context and inference analysis by identifying images as belong to an event, or to a photo-album, and having information about those other images ready. A detailed discussion of the various algorithms that can be executed by the CADI module 1340, some in connection with the marker analysis module 1320, is provided below.

According to one embodiment, the components of the marker analysis module 1320 may supply recognition information to programmatic or data elements that can use such information. In one embodiment, recognition information derived from each component of the marker analysis component 1320 may be generated and submitted to the indexer 1360, which then generates data for its index 1362. The recognition information may be indexed separately from each component, or combined into signatures 1352. In one embodiment, signatures 1352 is a vector value based on vector quantities supplied by all of the components of the marker analysis module 1320, either before or after influence from the feedback 1355 from the CADI module 1340. The index 1362 may store the recognition information from one or more of the components of the marker analysis component separately or additively.

In an embodiment, the CADI module 1340 may provide recognition signatures 1353 for a given person recognized from the image input 1302. Such an embodiment enables the recognition information from the marker analysis component 1320 to be indexed separately from data that is affected by context and data inferences. Alternatively, the recognition signatures 1353 from the processing algorithms of the CADI module 1340 (described in detail below) may substitute for signatures 1352 from the components of the marker analysis component 1320. For example, while each component of the marker analysis component 1352 may supply some form of recognition information for a given person detected from the image input 1302, the recognition signature 1353 from the CADI module 1340 may supply one recognition signature which takes into account recognition information from two or more components of the marker analysis component, as well as other factors such as event or photo-album determination. In addition to indexer 1360, information determined or extracted from either the marker analysis module 1320 or the CADI module 1340 may be provided as metadata with the image file that was analyzed as image input 1302. In one embodiment, this metadata 1356 may be provided with the actual image file 1366, so that recognition information and other information relating to recognition are carried with the image file. In another embodiment, the metadata 1356 may be provided with a metadata store that matches metadata (may include recognition information and signatures) with a given image file.

Context and Data Inference Processes

As illustrated with metadata extractor 1312, the header (EXIF) of an image file (e.g. JPEG) includes metadata that can be used in facilitating recognition. This information may include creation time (time metadata 1313), corresponding to when an image was captured, although it can also include location information of where the image was captured through cellular base information and/or GPS information. The time information 1313, as well as location information if provided, may be used by the CADI module 1340 to cluster in image provided as part of the image data input 1302 into a set. Such a set may denote that the image input 1302 is part of an event.

Two pictures (i, and j) are declared to be in the same event, if:

$|t1-t2|<\text{Threshold1}$ (criteria 1)

$|l1-l2|<\text{Threshold2}$ (criteria 2)

In other words, if the photographs were taken at a time close to each other, and at locations close to each other, they are linked to be in the same cluster. In another embodiment, only criteria 1 can be used to select the images grouped in time. In yet another embodiment, only criteria 2 can be used to group the photographs by location only.

With regard to time or event analysis, the CADI module 1340 may perform its analysis to provide the feedback data 1355 as follows. For a particular image with a time stamp scalar (ti), time difference for two faces between the image at hand, and an image known to the CADI module 1340 as having just previously been taken, can be calculated as $|ti-tj|$. This difference vector can be used as an input in order to determine a probability that the recognition information 1342 from the facial analysis component 1322 is correct in its determination. For example, if the time lapse between successive images is small, the chances are more likely that the two faces are the same. For example, if the time lapse between successive images is less than a second, then the odds are high that two images are the same person (assuming the images are taken from the same camera). These indications may be carried quantitatively or otherwise in the CADI feedback 1355.

Another analysis that can be performed to provide the CADI feedback 1355 is statistical in nature. In particular, CADI module 1340 may group images together as being part of a photo-album, when a photo-album is designated by the use or determined from other information. For example, the user may submit the photo-album as a folder on his computer, or the CADI module may identify all pictures taken on a particular day, and maybe at a particular location, as belonging to the same photo-album. In such cases, statistical analysis is useful with respect to appearances. Examples of factors that may be maintained and used by the CADI module 1340 in providing the feedback 1355 include: (i) some people tend to appear more frequently in the album, (ii) friends and family members, as well as certain groups of friends (for example, the photo owner's friends in Turkey) tend to appear in the same photographs; (iii) some people (e.g. husband and wife) usually stand close to each other in the photos. In other examples, the statistics can concern the same event (subset of the pictures which were taken within a certain short period of time): (i) an event photo usually tend to contain the same set of people (that are meeting, having dinner, taking a trip); (ii) in the event, some people may be appearing together (such as the people sitting at the same table in a restaurant). In yet another set of examples, other statistics can refer to a single photo. For example, the same person cannot appear twice in the same photo.

Clothing is another powerful marker which can aid identity recognition. CADI module 1340 may also using the clothing recognition information 1344 in its feedback 1355. In particular, clothing recognition information 1355 can be used to exploit the following dependencies: (i) people tend to wear the same clothing at an event, (ii) people possess certain easily recognizable items of clothing.

Appearance statistics can be used to fix some errors of the face and person recognition algorithms (as performed by the different components of the marker analysis module 1320). For example, based on the face information alone, uncertainty may exist as to whether a person next to "John" is John's wife, or a similar-looking person in Germany. In such a case, the appearance priors can be used to make an educated guess.

The various types of recognition information provided from marker analysis component 1320 may be used by the CADI module 1340 to generate identity/correlation information 1354. The identity/correlation information 1354 may correspond to a proper name of a person, or alternatively be in the form of relational data that relates recognition information from one person to an image file and/or to other persons or objects that are determined to be relevant to the recognition and/or identification of that person.

Once the identities are clustered within each photo cluster (i.e. event), then the CADI module 1340 matches together the identities from multiple events. For this, only the face information may be used, since people tend to change their clothes between different events. If the face vectors of two identities in different clusters look very similar, i.e. $\Delta f$ is smaller than a threshold T, then the clusters of those two faces are assigned to be the same identity.

Under another embodiment, the CADI module 1340 may incorporate the various markers into a coherent probabilistic graphical model, which is able to perform complex reasoning in order to find the most likely identity assignments.

The appearance statistics (a $2^{nd}$ marker) are probabilistic in nature, and are captured well using probabilistic graphical models, in particular undirected models such as Markov Random Fields (MRF), also known as Markov networks. In one embodiment, a model may be formed based on a determination of a probability corresponding to how likely a person is to appear in any photo, or to appear in a photo during a particular event using single probabilistic potentials. These potentials model the likelihood of the person to appear in a particular photo or event. The potentials can be estimated in practice by counting how many times a person appeared in a labeled ground truth dataset, and these counts can be extended by adding additional "prior experience" which we may have about person appearances. Having a labeled ground truth dataset is not a necessary requirement, particularly when the CADI module 1340 bases its determinations on input from the marker analysis module 1320. Instead, the previously described face recognition engine can be used to provide beliefs about the identity of unknown examples; the potential counts can be obtained by adding these beliefs. Similarly, the relationships between several people can be captured using potentials over pairs or triples of variables, which assign likelihoods to all possible combinations of the variables involved.

The CADI module 1340 may also execute a reliable sex classification algorithm markers to constrain the set of possible matches for a person. Sex recognition can be performed by using training a classifier such as provided by the techniques of Adaboost and Support Vector Machine. The classification of sex by the algorithm is denoted as (si).

Additionally, CADI module 1340 may utilize hair color, length and style in providing the feedback 1355. For example, some people consistently maintain the same hair appearance, while others maintain the same hair appearance during an event. The hair can be extracted using a box in a pre-set location above the face box, as well as using an algorithm for color-based segmentation. The color of the hair, and its shape are encoded in a vector (hi). This vector may be provided by the hair recognition information 1346 and compared to known information about hair in relation to pictures from a common event.

The CADI module 1340 may perform additional recognition through use of one or more "double binding" techniques. Recognition information from any combination of two or more components of the marker analysis module 1320 may comprise use of a double binding technique.

Under one double binding technique, a grouping of images from an event are identified, using for example, time information 1313 and location information. In one embodiment, faces in images from a set of images correlated to an event may be compared to one another. For example, two faces face m, and face n may be compared as follows:

1. If photo of face m, and photo of face n are in the same cluster, both face and clothing information are used:
   a. Clothing vector difference is calculated: $\Delta c = |cm - cn|$
   b. Face vector difference is calculated: $\Delta f = |fm - fn|$
Then, the final difference vector is calculated as a weighted, linear or non-linear combination of the two, i.e. $d_{mn} = \alpha_c(\Delta c)^\beta + \alpha_f(\Delta f)^\gamma$ 1. If photo of face m, and photo of face n are not in the same cluster, then only the face information is used:

$$d_{mn} = (\Delta f) = |fm - fn|$$

Figure 14A:
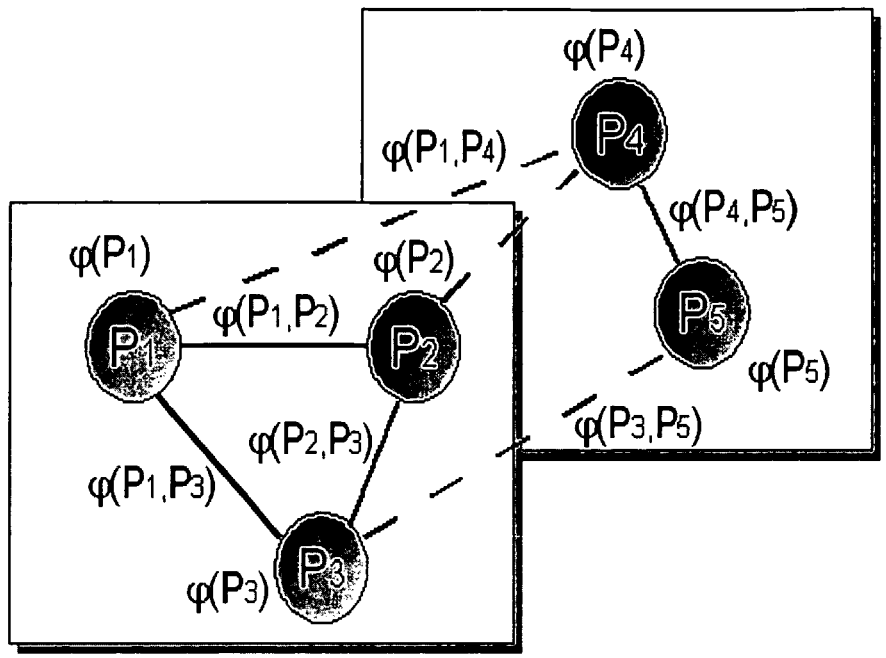
FIG. 14A is a graphical representation of the Markov random field, which captures appearance and co-appearance statistics of different people, under an embodiment of the invention.

To illustrate a technique that can be performed by the CADI module 1340, FIG. 14A is a graphical representation of the Markov random field, which captures appearance and co-appearance statistics of different people. A simple instantiation of the MRF model to a domain instance with two images is shown in FIG. 14A. In the figure, each rectangle represents an image in the album. Each circle represents a variable Pi corresponding to the identity of the detected face in that place in the image. There is an additional entity unknown corresponding the case when we are not sure who the person is.

This allows the person analysis module 1220 shown in FIG. 12 and FIG. 13 to capture face recognition information and appearance counts information in the same model. Additionally, pairwise (and possibly, higher-order) co-appearance potentials $\Psi(P_i, P_j)$ can be introduced to capture the likelihood that the respective people appeared together in this image.

Given the MRF model described above, the CADI module 1340 can perform probabilistic inference, so as to find the most likely identities which maximize the likelihood of the model. The inference effectively combines the beliefs provided by the face recognition algorithm, and the beliefs derived from the appearance statistics. This inference can be performed very efficiently using standard techniques such as Markov Chain Monte Carlo algorithms, Loopy Belief Propagation, Generalized Belief Propagation and their variants, or Integer Programming.

If the potential parameters are not derived from ground truth examples (of which there may be too few), but from the identity beliefs provided by the face recognition information 1342, the overall results can be improved by the following iterative scheme, which can be run until convergence:

1. Run probabilistic inference using the current potential parameter estimates

2. Use the resulting beliefs to re-estimate the potential parameters. This is done by maximizing the joint log-likelihood of the counts model, using counting and gradient ascent techniques.

In a model such as described with FIG. 14A, the pairwise potentials can contain parameters, which specify how likely two particular people are to be seen in a particular image. If a separate parameter for each pair of people is used, the number of parameters available to estimate from a particular album grows quadratically with the number of people the album contains. A more robust estimation scheme that can be performed by the CADI module 1340 would allow parameter sharing for groups of people. This can be accomplished by automatic clustering of the people into groups that tend to appear together, and using the use the same parameters for all people in the group.

Under an embodiment, an approach starts with using ground truth data in combination with face recognition information 1342 and possibly other recognition information from other the markers (e.g. clothing, sex and hair). These results come in the form of recognition beliefs for each face in the dataset, and can be deterministic (if the example is labeled in the ground truth) or probabilistic (if the identity estimate is provided by the face recognition algorithm). For each image, the beliefs can be added to obtain a vector with a different value for each person. This value corresponds to the likelihood of that person to appear in the image (the likelihood does not have to sum to 1, it can be normalized subsequently).

In one implementation, entire album can be represented as a person-image matrix, whose columns correspond to beliefs generated by the CADI module 1340 about the appearance of different people in the images. From such a matrix, what is extracted is information identifying groups of people that tend to co-appear in the same images. This can be achieved with matrix factorization techniques such as Latent Semantic Indexing, or Non-negative Matrix Factorization, or with probabilistic clustering techniques including, Naïve Bayes clustering, and Latent Dirichlet Allocation. As a result of these techniques, several clusters of people may be identified by, for example, the CADI module 1340. In the pairwise potentials, they will share the same pairwise parameters accounting for interaction within the group, and for interaction with other groups of people.

Double-binding techniques employed by the person analysis module 1220 may also incorporate clothing information as a primary factor in determining or confirming recognition of a person. An embodiment assumes that in a detected event (e.g. as determined from the time information 1313), people tend to wear the same clothing. For this purpose, a set of clothing variables Ce,j may be introduced and used by a double-binding algorithm run on the CADI module 1340. Each such variable corresponds to the clothing of a particular person j at event e.

Figure 14B:
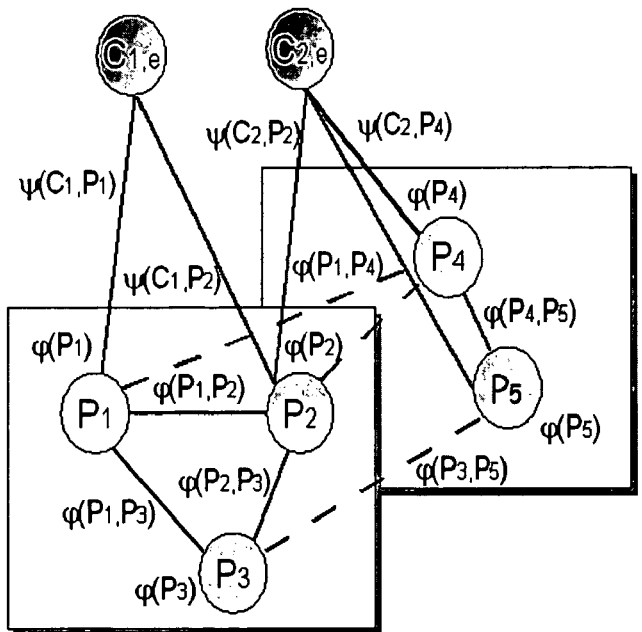
FIG. 14B is another graphical representation of the Markov random field, incorporating clothing recognition, under an embodiment of the invention.

FIG. 14B is another graphical representation of the Markov random field, with clothing incorporated into the model, under an embodiment of the invention. The clothing descriptors can be obtained as follows:

1. If ground truth examples is available for that person and that event, the clothing descriptor of the examples are entered into the domain.

2. If the face recognition system is fairly certain about the identity of some people at a particular event, their descriptors are also entered into the domain.

3. A unknown clothing setting is also introduced, to account for the case when the person's clothing in the above examples is not representative of the whole event.

The clothing variables Ce,j are connected to the identity variables Pi in the same event using pairwise potentials $\psi(Pi, Cj)$ (if there is sufficient reason to believe that Pi can be person j), as shown below:

The values of these clothing potentials $\psi(Pi, Cj)$ can be determined as follows (many variations of this are possible)

1. If pi≠j (the identities don't match), then $\psi(pi, cj)=1$

2. If pi=j, and cj contains a known clothing descriptor then $\psi(pi, cj) = \max(\exp(-\alpha c \|c(pi)-c(cj)\|^2), \beta c)$ where $\alpha c$ is the clothing importance weight, and $\beta c$ is a clothing penalty threshold.

3. If pi=j, and cj corresponds to unknown clothing, then $\psi(pi, cj)=\gamma c$, where $\gamma c$ is a constant describing how preferable the unknown model is.

In such a model, the precise appearance of a particular person may not be known apriori, but can be figured out during the inference process in the model, which will discover the most likely joint assignments to the person identities and the clothing worn by those people.

In another embodiment, clothing can be also modeled not just for a particular event, but for the entire album as a whole. Instead of having separate Ce,j variables for each event e, clothing variables Cj can be connected to identity variables throughout the entire album. More complicated potentials may be necessary to capture the many possible items of clothing people possess. These potentials may be represented using mixture models, although other representations are also possible.

The remaining markers, such as sex and hair can also be incorporated in the algorithms performed by the CADI module 1340, in much the same or similar way as clothing recognition information 1344 is handled. Sex is clearly maintained through the entire album (with small exceptions). Hair appearance is normally preserved during a particular event, and is often preserved in the entire album. The CADI module 1340 may capture this either by creating separate variables for hair and sex, similar to how clothing was used, the CADI module 1340 can create more complex variables which may capture a group of clothing/hair/sex descriptors simultaneously.

System for Text Recognition

Figure 15:
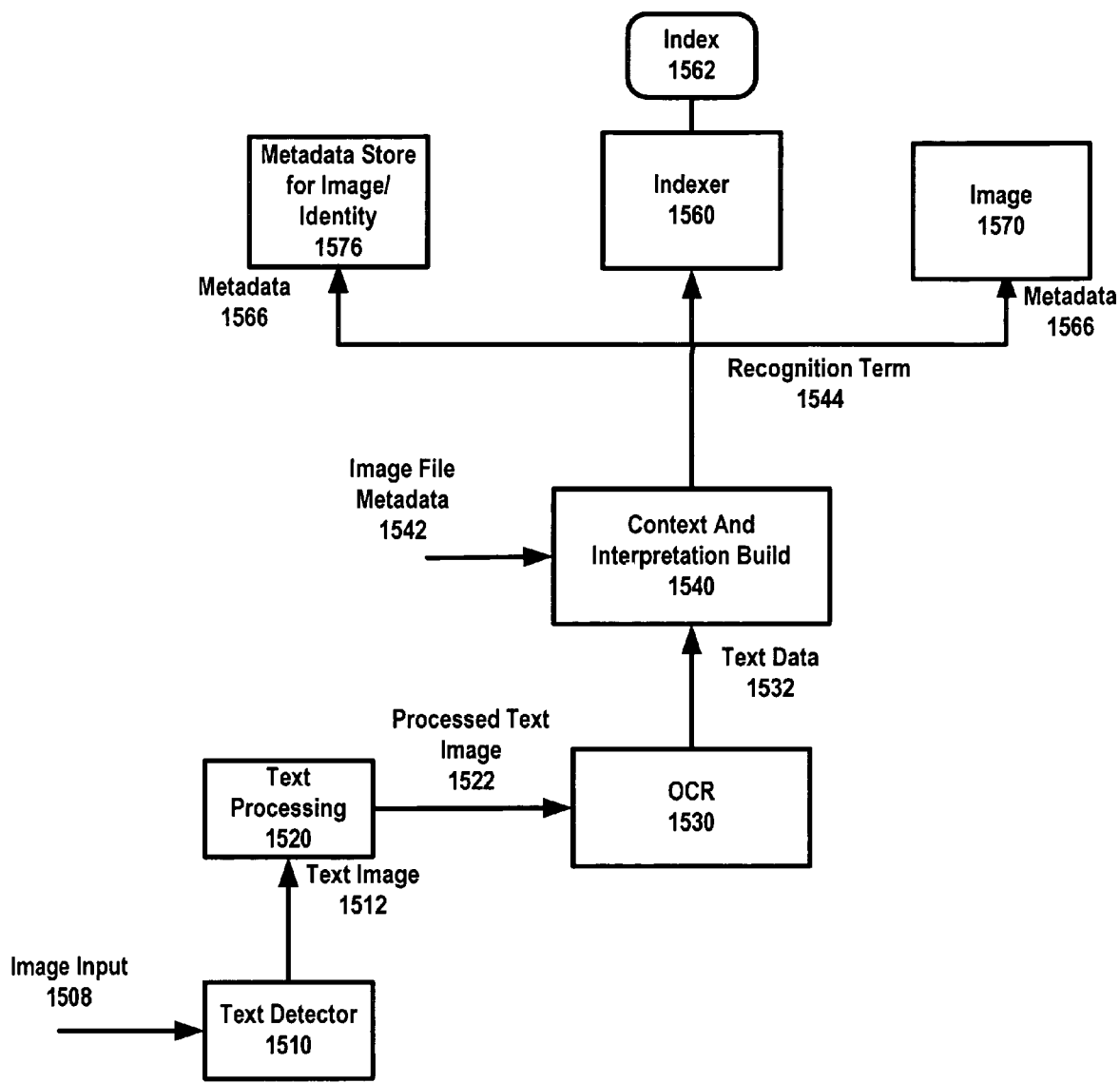
FIG. 15 illustrates a system for text recognition of text carried in images, under an embodiment of the invention.

FIG. 15 illustrates a system for text recognition of text carried on objects in images, under an embodiment of the invention. In an embodiment, a system such as shown by FIG. 15 may correspond to text analysis component 1224 of the image analysis module 1220. A system such as shown by FIG. 15 enables the analysis of image data for recognition of text carried on objects appearing in the image. A system as shown also enables the use of recognized text for purposes of indexing and other uses.

According to one embodiment, a system includes text detector 1510, text processing component 1520, OCR 1530, and context and interpretation build 1540. The text detector 1510 detects the presence of text on an object. For example, a scan of an image may be performed to detect edge characteristics formed by letters, as well as detection of other characteristics such as intensity, gradient direction, color information which correlate to the presence of text.

The text processing component 1520 may be used to normalize the appearance of the text image 1512. For example, the text processing component 1520 may normalize the appearance of text for skew, slope, scale factor and contrast yield, as described with other embodiments.

A processed text image 1522 is forwarded by the text processing component 1520 to the OCR. The OCR recognizes the processed text image 1522, meaning that the text image is converted into text data 1532. However, as mentioned with previous embodiments, not all recognized text is material or relevant for use. An understanding of the significance of the text is needed in order to, for example, have a need to index it. Accordingly, the context and interpretation build component 1540 may perform programmatic steps in determining the significance of the recognized text data 1532. The context and interpretation build component 1540 may employ a dictionary, thesaurus or other literary tool to determine the nature of the text data 1532. Another tool that is useful is a list of proper names of businesses, including companies with interstate commerce, and businesses of a local nature (a local restaurant). Other factors that can assist determination of context include text location and size, contrast about the text, and the sharpness of focus of the text data. While text data 1532 may not have many of these original characteristics, information about the image containing the text may be preserved and passed to the context and interpretation build component 1540. In determining significance, the context and interpretation build component 1540 may also receive and use metadata 1542 provided with the image file transferred. This metadata may correspond to, for example, a file name of the image, a directory name from which the image file was copied, and an album name that carries the source image. Thus, for example, if "Birthday" is contained in the name of the file, directory, or album from which the image file originates, the appearance of text indicating the proper name of a location (e.g. of a city) may be deemed pertinent.

A recognition term 1544 may be outputted by the context and interpretation build component 1540, as a result of detection and interpretation of text on an object appearing in an image. Among other uses, the recognition term 1544 may be indexed by the indexer 1560 so as to be associated with the image file in the index 1562. The index 1562 may carry text information and correspond to, for example, ID Information Indexer 1240 of FIG. 12. This is in contrast to an index that carries recognition signatures or vectors. The recognition term 1544 may also be combined with the metadata 1566 carried in an image 1570, or be associated with the image as external metadata via a metadata store 1576.

Search and Retrieval

Figure 16:
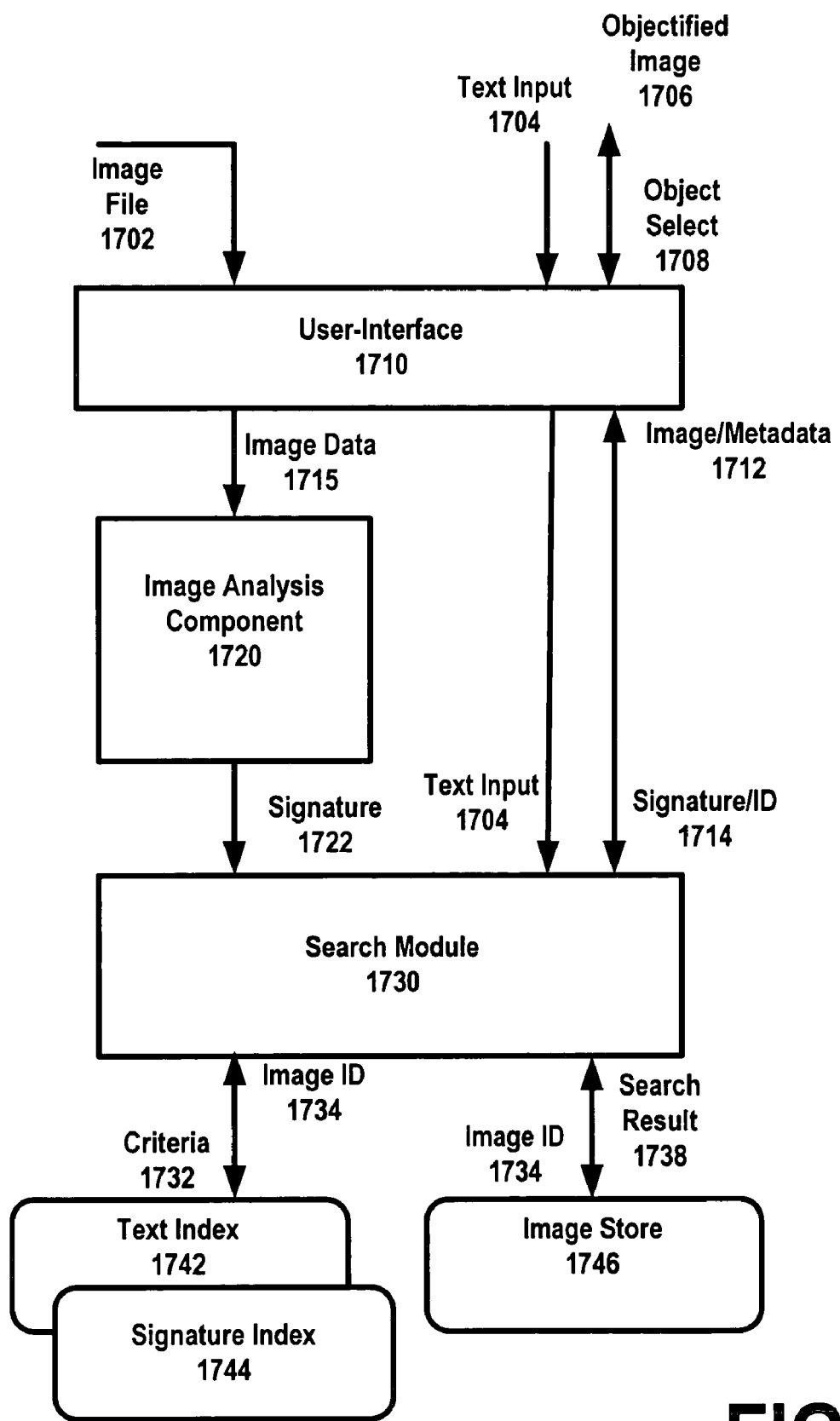
FIG. 16 illustrates a system in which searching for images based on their contents can be performed, under an embodiment of the invention.

As described with other embodiments, search and retrieval of images is one type of functionality that can be achieved with the detection and recognition of persons, text and objects in images. FIG. 16 illustrates a system in which searching for images based on their contents can be performed, under an embodiment of the invention. According to one or more embodiments, the components shown by FIG. 16 may be integrated with other systems shown in FIG. 12 or elsewhere in this application.

In FIG. 16, a search and retrieval system is shown to include a user-interface 1710, an image analysis module 1720, and a search module 1730. The image analysis module 1720 may be configured in a manner similarly described in other figures. The search module 1730 corresponds to a component that matches search criteria with index values stored in one or more indexes. Specific indexes shown in FIG. 16 include a text index 1742 and a signature index 1744.

Embodiments contemplate different types of user-input, which are then converted into input for specifying a search criteria or criterion. One type of input may correspond to an image file or image data 1702. For example, a person may submit a JPEG image of a face. Another type of input may correspond to text input 1704. For example, rather than specify an image, the user may enter the proper name of an individual, assuming that person and his image are known to the system. Still further, another type of input that may be specified by the user is selection input 1708, which in one embodiment, may be based on the rendering of an objectified image 1706. Objectified images 1706 are illustrated with FIG. 18 and FIG. 19, in that they present a digital image with recognized objects enabled as graphic user-interface features that are selectable.

The user-interface 1710 forwards input from the user to the search module 1730. If the input is image input 1702, the user-interface forwards image data input 1715 to the image analysis component 1720 as an intermediate step. The image analysis component may recognize what, if any, objects in the image input 1702 are searchable. In one embodiment, suitable search criteria may correspond to (i) a face or portion of a person appearing in an image, (ii) text carried on an object, and (iii) any other recognizeable object, such as a landmark. The operation of the image analysis component 1720 may be in accordance with any other module or method or technique relating to recognition of these types of objects in image. As for the face or portion of the person, while the face recognition may be unique to the person, it is also possible to simply generate less granular recognition information that can be correlated to a search criteria. For example, search criteria may correlate to the color of clothing, or the color or type of hair, or similar looking faces.

If the user-input is text input 1704, the user-interface 1730 may forward the text input to the search module with little additional modification. In the case where the user-input corresponds to an object selection input 1708, the user-interface 1710 may forward a signature and/or an identifier 1714 to the search module 1730. The objectified image 1706 may carry identifiers, such as in the form of names or identities of individuals appearing in images, in the header of the objectified image 1706. Alternatively, as shown with FIG. 19, such metadata information and data may be stored in a separate data store, separate from the image file. The user-interface 1710 may extract the identity of the person selected and forward that data as text to the search module 1730. Alternatively, if no identity of the person is known, the selection input 1708 may correspond to submission of a recognition signature (or information) of the selected person/object. Still further, the recognition signature may be used to determine similarity matching, even if the identity of the person is known. As stated previously, the recognition signature may be a dimensional vector or value, and not a name or other text identifier. In one implementation, the recognition signature is carried with the header of the image. In another implementation, the recognition signature is determined by matching an identifier of the image to the recognition signature using a data store that is external or otherwise. The search module 1730 may perform comparison functions of criteria to index data. In the case where the user-input is text data 1704 or selection data 1708 (which may get converted to text data), the input to the search module may be in the form of text data. For example, the user may enter the first and last name of a person he wishes searched, or the user may select that person's face from an objectified image rendering. In either case, the search module receives text input as search criteria. When receiving text input, the search module 1730 uses a text criteria 1733 determined from the text input to determine image identifiers 1734 from the text index 1742. Then the search module 1730 may retrieve a search result 1738 comprising image files corresponding to the image identifiers 1734 from an image store 1746.

If input to the search module 1730 is a signature (such as when received by image input 1702 or possibly from selection input 1708), then a different type of search may be performed. Signature input 1722 is not text based, and as such, the criteria 1732 derived from that input may be non-text. In one embodiment, the criteria 1732 corresponds to the signature input 1722, and it is matched or compared (less precise than match) against other signatures in the signature index 1744. In one embodiment, a nearly exact match to the signature input 1722 is identified, meaning that the search result 1738 will comprise of images of the person who appears in the objectified image. In another embodiment, similarity matching is performed, meaning the search result 1738 may comprise of image files containing persons (or even dogs or animals) that are similar in appearance, but different than the person appearing in the image.

With regard to providing the search result 1738, the components that comprise the search result may be programmatically ordered in their presentation to the user. This may be accomplished using the following technique(s) and variations. As described in previous sections, images can be tagged for indexing and other purposes using various techniques. When a tag is searched, the system may invoke all the images with the particular search tag. In presenting, for example, a search result of all images with matching tags, an embodiment is provided that ranks the images in a programmatically determined order for purpose of presentation a user. In other words, this methodology answers the question of "which image comes first, and how are the results ordered".

The methodology uses a combination of metrics. As an example, metrics can be confidence of the algorithm, consumption, difference measure, user picture ranking, and friend's images. These metrics are described as follows.

Confidence is usually an output metric that is useful in determining a presentation order for individual components of a search result. For instance, the text recognition algorithm provides a confidence number regarding the text, and similarly a face recognition algorithm provides a confidence number regarding the faces. Each of these confidence numbers can be used in deciding which result to show first. If the algorithm is more confident of its result, then those results are ranked higher, and shown first.

Consumption is defined as how much that image is viewed, and how often it is clicked to reach to other images and ads. According to an embodiment, a programmatic element keeps a record of how many times each image is displayed and clicked. In one implementation, the programmatic element is part of a service, and it maintained on a server. If an image is consumed and viewed more, then that image's rank is increased.

Difference measure is calculated using the visual signatures of the images. When the user does a particular search, the system makes sure that it does not show the same exact view and image of the search item or person.

In one embodiment, the system includes a framework to rank each image as he or she views them. These user rankings are stored in the server's records. The user ranking can be used as part of the ranking process. The images that are ranked higher by the users are shown and served first.

In a social networking implementation, for example, a system can build a social network for everybody. For this, the system associates the people in one's photographs as his or her friends. In one embodiment, if a person does a search, and some of the hits to the search are actually images posted by his friends, then those images are ranked higher and served first.

Under one variation, search module 1730 may make a search request outside of the system shown in FIG. 16. For example, the search module 1730 may submit a search request based on the user-input to a third party network search engine (such as GOOGLE). In one embodiment, if the user input is text, then the request is the text submitted. If the user input is image, then text associated with the recognition of that image may be used.

Accordingly, an embodiment such as shown by FIG. 16 provides a system in which search may be performed with different kinds of user-inputs. Specifically, an embodiment shown by FIG. 16 enables search of images based on criteria that is in the form image data (e.g. a user-submitted image file), image data selection (e.g. user selects a selectable object from an objectified image rendering) or text input (e.g. user enters the name of a person). As shown by FIG. 16, either kind of input can be used to search one of two indexes-text index 1742 or recognition index 1744.

As described with embodiments of FIG. 12 and FIG. 16, recognition signature may be used to provide search results in response to image input. In order to provide such search results, recognition signatures of objects (e.g. faces, people, text) in images need to be compared to signatures of other like objects in other images. Exact matching may be performed to find the same object (e.g. match a face with the same face in another image), or similarity matching may be performed to match an object with a look alike that is not the same object (e.g. show two people who look alike). while finding similar images/objects in a database of images. It is contemplated that such matching may be implemented on a very large scale, such as on a server or service that stores millions or billions of images. In such an environment, when the user provides an example, the server needs to get the similar images in a few seconds, or less. Accordingly, one embodiment provides for framework to enable fast comparison of images, particularly in an a large scale environment.

As described with other embodiments, recognition signatures may be calculated for objects recognized from images, or, if need be, for the entire image itself. Once a recognition signature is built, an n-level tree may be built to index all images. Such an index may correspond to, for example, recognition signature index 1252 of FIG. 12. As an example, a tree may be structured with ten branches at every node. At each level of the tree, the samples are divided into k=10 (number of branches per node) using a K-Means algorithm. K-Means cluster centers are saved at each node as the representation of that particular node. This way, for example, a billion images may be indexed in approximately 9 levels.

When comparing a user provided image, first, the recognition signature of an object (e.g. such as a face) of the image is calculated. Then, the recognition signature is calculated against the n-level tree. At every node of the tree, the recognition signature is compared against the node representation vectors. The tree link that has the closest representation match is chosen as the node, and a better match is searched in the children of that particular node. This process is repeated for every level of the tree until the algorithm reaches the leaves (a node that terminates) of the tree. This is indeed a typical tree search algorithm, with recognition signatures as the indexes at the nodes. Using this comparison algorithm, and using a tree with ten branches at every node, an image can be compared against a billion in images with only ninety (9levels*10 branch/level) comparisons. As such, a fast image matching system can be built using this algorithm.

Objectified Image Renderings

Embodiments of the invention provide for the use of objectified image renderings. Objectified image renderings correspond to images that contain recognized objects, and these objects are interactive in some form with the user. For example, in one implementation, a user may hover a pointer over a rendering of an image on a computing device, and if the pointer is over an object that has previously been recognized, then information is displayed relating to or based on the recognition. In another implementation, a user may select an object that has previously been recognized from the image, and the selection becomes a criteria or specification for identifying and/or retrieving more images. Such an implementation is described with an embodiment of FIG. 16.

Accordingly, one embodiment provides for images to be displayed to a user in which individual images can be objectified so that recognized objects appearing in the image are capable of being interactive. In one embodiment, metadata of an image file may be supplemented with other data that identifies one or more recognized objects from the image file. When the image is rendered, the supplemental data is used so that the one or more objects are each selectable to display additional information about the selected object.

Figure 17:
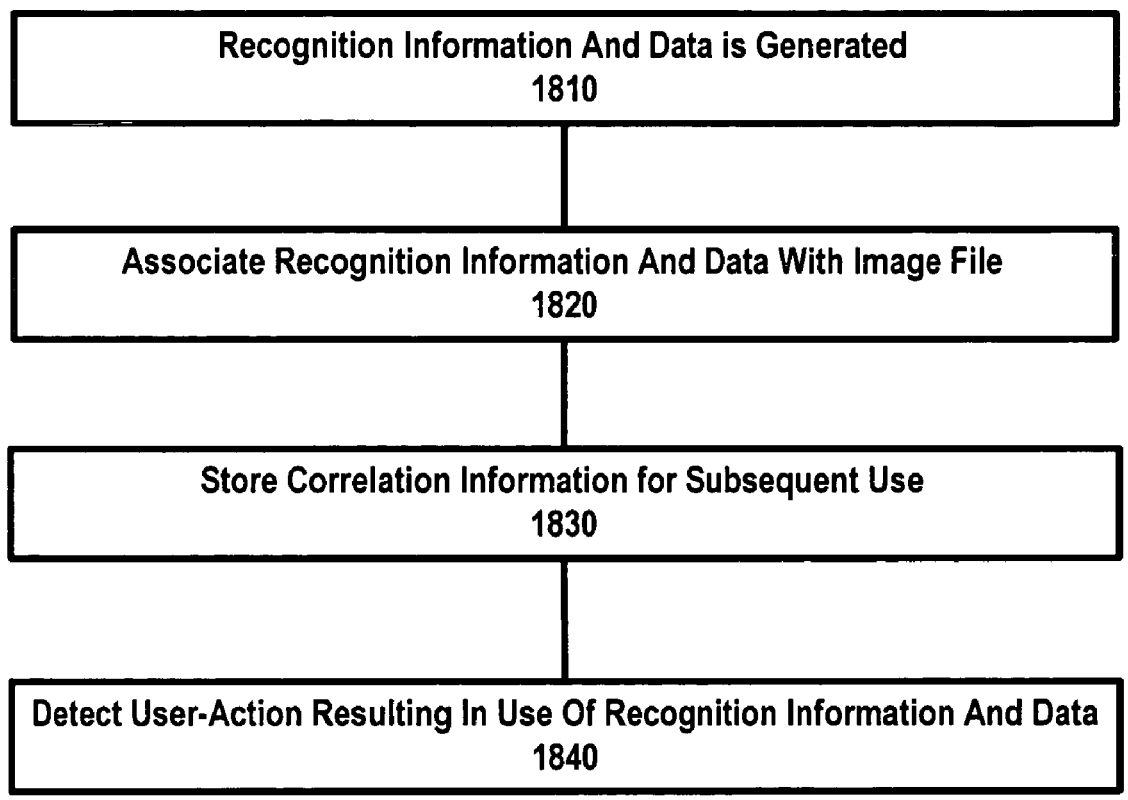
FIG. 17 describes a method for creating objectified image renderings, under an embodiment of the invention.

FIG. 17 describes a method for creating objectified image renderings, under an embodiment of the invention. A method such as described may be implemented using various components and modules of different systems described with one or more embodiments of the invention.

In step 1810, recognition information and data for a given image file is generated. In one implementation, the recognition information may be in the form of metadata and text. The metadata may identify what portion of the image of the file is recognized, such as for example, the region where a face in the image file is recognized. The text portion of the recognition information may provide text-based recognition information, meaning that the recognition has been correlated to a name or other identifier of the recognition.

Figure 18:
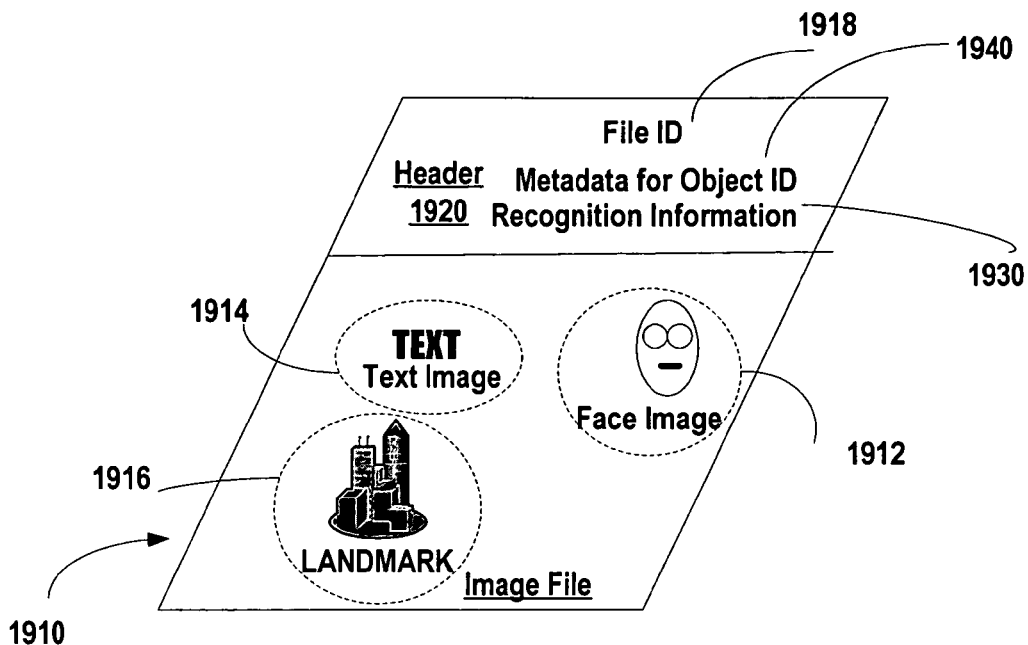
FIG. 18 is a representation of an objectified image file as rendered, under an embodiment of the invention.
Figure 19:
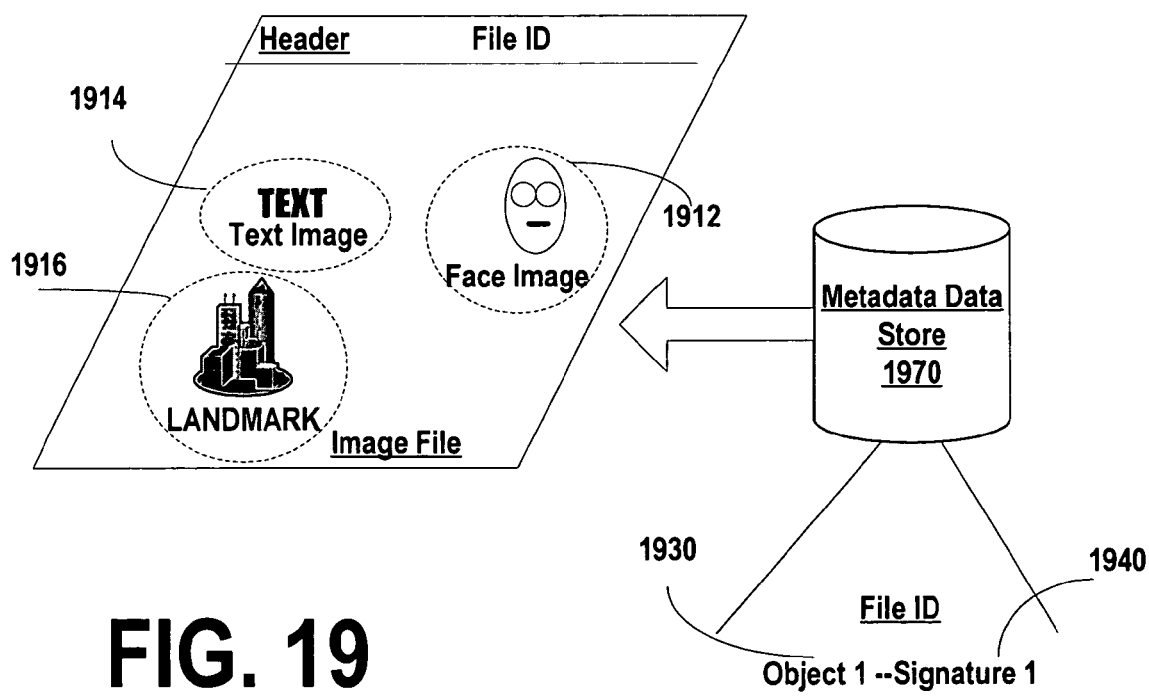
FIG. 19 is a representation of an objectified image file as rendered, under another embodiment of the invention.

Step 1820 provides that the recognition information and data is associated with the image file. As shown in FIG. 18, one implementation provides that the recognition information and data is stored in a header of the image file. As shown in FIG. 19, another implementation may separate the recognition information and data from the image file.

In step 1830, the image file may be rendered in objectified form. For example, the user may open the image file from his personal computer and view the image. When the image is viewed, the metadata makes active regions of the image that have recognition information associated with it. For example, a region of the image in which a face is provided may be made active, because recognition information (in the form of a name of the person) is associated with that region of the image. In one embodiment, the metadata makes the corresponding portion of the image active by identifying the location of the image that is to be made active. The client application may be configured to make the image portions active based on reading the metadata. For example, the user may run an image viewer or browser that makes image portions active in response to interpreting the metadata in the header.

In step 1840, an action is detected in relation to the location of the image made active by the metadata. This action may correspond to, for example, a selection action, such as in the form of a user clicking a mouse or pointer device. The programmatic translation of the user performing the selection action may be one of design or implementation choice. For example, the programmatic action resulting from the user selection may be in one of the following: (i) displaying the text based recognition information associated with the region of the image, (ii) performing a search or retrieval of a library of images for images that are associated with the recognition information of the region in the image, (iii) submitting a search or retrieval to a network search engine (e.g. GOOGLE) based on the recognition information associated with the selected region of the image. Thus, when the user action is detected, the recognition information associated with that location of the image is used for a specific programmatic action.

In FIG. 18, an objectified image file 1910 is represented as having one or more recognized regions 1912, 1914, and 1916. Consistent with various embodiments described, the recognized regions 1912-1916 may correspond to persons (including faces), text carried on objects, and other designated objects such as landmarks. According to one embodiment, once the images are tagged, the metadata (tags and indexes) can be saved in various forms and locations. In one embodiment, the metadata is saved as part of the image header data. As an example, but without any limitation, it can be saved as part of the EXIF data.

In an embodiment, metadata stored in the header of an image file can be encoded. Coding in the image header enables the image data from the image file to be read independent of platform or location. In another embodiment, the metadata is written to the image header, yet it is not encoded in any ways. In this case, the image and the metadata can be editable, and extendable by any programs and by anybody. This provides a chance for the metadata to be universal.

In FIG. 18, the image file 1910 includes a header 1920 in which (i) object metadata 1930 and (ii) recognition information 1940 is provided. The header 1920 may also include metadata normally provided with an image file, such as image identifier 1918, and creation or modification time. The object metadata 1930 indicates regions in the image where recognized objects are provided, such as the coordinates defining the regions where the person 1912, the text 1914 or other object 1916 are provided, as well as their corresponding recognition confidence values. While showing an image using a viewer, first the metadata is loaded from the header of the image, or from the central server. The metadata is then displayed as part of the image whenever the mouse comes on to the image. In one embodiment, the metadata is shown as an overlay on the image.

In an embodiment, the recognition information 1940 is correlated, meaning it is text that is correlated to a recognition signature or other quantitative indication of the object recognized. For the person 1912, the recognition information may be a name, for the text 1914, it may be an interpretation of the text, and for the other object 1916, the recognition information may be an identifier of what that object is.

Figure 20:
FIG. 20 provides an example of an objectified image rendering, where metadata is displayed in correspondence with recognized objects in the image, under an embodiment of the invention.

FIG. 20 shows an example of an image in which the metadata can be displayed in an interactive manner, so as to make the image an objectified image rendering. Once the mouse is on the image, all the tagged faces, text and possible other examples are shown as an overlay on top of the image.

According to one variation, recognition information 1940 may correspond to extrapolated information. For example, the recognition information for the text 1914 may be words or content associated with the recognized word.

Under another variation, object metadata 1930 may be associated with additional data or information that is relevant to one of the recognized objects when the image file is rendered. For example, the recognition information 1940 associated with the person 1912 may further be supplemented with a biography of the person. The biography of the person may appear when the user selects the person's face. The biography data may be carried in the header, or the header may include a link or pointer to it. As another example, the text may have associated with it a URL to a particular web site. Various combinations and alternatives are contemplated consistent with these examples.

FIG. 19 illustrates another embodiment in which metadata 1930 and recognition information 1940 is stored in a data store 1970, external to the image file being rendered. In one embodiment, a client application may match the image file (e.g. by image file identifier in the header file) with the object metadata 1930 (defining position of recognized object) and recognition information 1940 (providing recognition of defined positions). The location of the data store 1970 may be anywhere. For example, the data store 1970 may be located on a network when the image is rendered on a client, or located on the terminal of the client. image with its metadata. This scheme assures that metadata is kept securely, and it is shared based on permissions.

Additionally, it is possible for the metadata stored with an image file to be lost, through the use of image editing programs such Photoshop (manufactured by ADOBE INC.), or if the user resizes or edits the image. In order to find the metadata corresponding to any images, one embodiment provides that a visual signature is calculated for every image, and saved as part of the metadata at a central server. When an image with no key or metadata in its header is observed, a visual signature is calculated and compared against the visual signatures. If a visual signature matches, then the metadata associated with it is assigned to the image. Visual signatures may be maintained in an index such as described with FIG. 12 and with FIG. 16, but for visual signature and recognition signatures may be different in what they represent. In one implementation, recognition signatures may be for objects in images, while visual signatures are more for identifiers of the whole image.

In one embodiment the visual signature of an image is calculated by getting the color or grey scale histogram of the image. The histogram is invariant to rotation and scale of the image. In another embodiment, a thumbnail of the image is used as its visual signature. In another embodiment, the image is uniformly divided into several smaller rectangle regions. A histogram is calculated for each rectangular region, and the collection of the histograms is used as the visual signature. In another embodiment, a hash value of the image is used as a visual signature/ID for the image. Identification of images that match the visual signature of an image may be provided using a fast search algorithm described elsewhere, where the visual signature of the image is used as a comparison against other visual signatures.

Similarity Matching of Persons

Similarity matching means that an image of a person may be quantitatively recognized, then compared to find another person deemed to be similar to the person recognized from the image. When a person is recognized then subjected to a similarity matching, the result (whether by image or otherwise) is of a person who is different than the person recognized. For example, similarity matching may be performed as a search and retrieval operation, where the search criteria is a face (e.g. the user's face), and the search result is a look-alike to that person. Specific examples include a person submitting his picture to find someone else who looks like him, or a person submitting his picture to find a person who he resembles that is famous.

Figure 21:
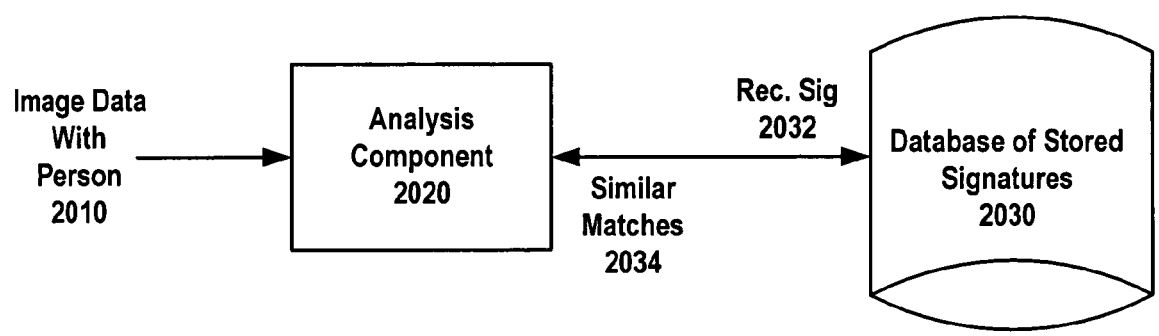
FIG. 21 illustrates a basic system for enabling similarity matching of people, under an embodiment of the invention.

FIG. 21 illustrates a basic system for enabling similarity matching of people, under an embodiment of the invention. In FIG. 21, image data 2010 including a person (or portion thereof) is received by an analysis module 2020. The analysis module 2020 may recognize the person in the image, through any of the techniques described with embodiments of the invention. For example, the analysis module 2020 may correspond to the image analysis module 1220 of FIG. 12.

According to one embodiment, in order to perform similarity matching, no identity or correlation information is needed for the image acting as input. Rather, the user may simply provide an image and have that image recognized quantitatively (e.g. as a recognition signature), and then have that recognition signature be the basis of comparison in similarity matching.

A system of FIG. 21 includes a database 2030 containing the recognition signatures of a library of people. In one implementation, a system of FIG. 21 is implemented as a network service, such as provided over the Internet. The database 2030 may include recognition signatures 2032 from numerous users of the system, or alternatively, from non-users who have images available for recognition determination. Specifically, under one implementation, the database 2030 may include recognition signatures 2032 from celebrities or other people that are famous or well known.

In addition to determining the recognition signature for the person in the image being analyzed, the analysis module 2020 may perform a comparison operation on the contents of the database for the recognition signature 2032 that most closely match or are similar to the signature of the image most recently analyzed. Similarity matches 2034 may be returned to the person, in the form of images of persons deemed to be similar in appearance, as determined by a comparative standard set by the system. As an alternative to returning images, the identity or name of the similar looking person may be returned.

One result of an embodiment such as shown is that a person can enter his picture to discover his nearest known look-alike (the "lost twin"). Another example of how an embodiment may be implemented is that a person can submit his picture to a network service in order to determine a celebrity look-alike. Still further, the returned result may be of a historical figure that most closely resembles the appearance of the person being recognized.

As an alternative to identifying similar looking individuals, an embodiment provides that the user can enter as input an image of a person to be recognized, and specify (or provide as input to be recognized or otherwise) the individual that the recognized image is to be compared against. For example, a user may enter his own picture and specify the celebrity he or she wishes to be compared against. Or the user may enter his picture, and the picture of a family member, and request a programmatic comparison that states how close the two family members are in appearance. In either case, the result provided in such an embodiment may be a quantitative and/or qualitative expression of the degree in which two individuals have a similar appearance. Furthermore, the basis of the comparison does not necessarily have to be facial characteristics, it may be stature, hair, gender, ethnicity, skin color, clothing and/or other physical characteristics of the person, when considered alone or in combination.

However, other embodiments provide that the face is the primary source of features for performing both recognition and determining similarity matching. Given a face, the system can extract features from the face that describe the given face. These features are then used to find similar faces. Similar faces will have closely matching features.

The more faces that exist in the database, the better the similarity search results will be. However, the features that describe the faces lie in a high-dimensional space and finding the most similar faces from a large high-dimensional dataset is extremely computationally expensive.

For any search operation in which recognition signatures are compared against other recognition signatures, the performance of the matching is computationally intensive, particularly when the database being matched against has a large number of signatures. In order to facilitate matching of recognition signatures, one embodiment provides for a tree-structure as described below to search the high-dimensional space efficiently. Such an embodiment may utilize a feature vector. In one embodiment, the feature vector of a face includes information derived from principal component analysis (PCA). PCA is applied to several regions of the detected face. The face feature vector may include the union of the PCA of all the face regions, which include the whole face, the left eye, and the right eye.

Alternatively, the face feature vector may include color histogram information. Specifically, color histograms may be computed for the hair region and the skin region of a person being recognized. The face may be detected automatically in a manner such as described with FIG. 3. Once detected, the face position in the image can be used to determine a skin box and hair box in the image. The color histograms are computed for the skin and hair boxes.

Additionally, the feature vector includes information on the sex of the face, the ethnicity, and the hairstyle. This information can come from both automatic classification and from user provided data. Machine learning may be used to train classifiers to determine sex, ethnicity, and hairstyle from user data and the detected faces.

The different parts of the feature vector (PCA face and eye regions; skin and hair color histograms; and sex, ethnicity, and hair classification) are weighted by their importance and combined into a single face feature vector. The particular weighting used may be one of design implementation. The similarity of two faces is computed by comparing the two corresponding feature vector. In one embodiment, the similarity score is the sum of the absolute value difference of each term in the feature vector (the L1 distance norm). In another embodiment, an L2 norm distance can be used.

As an alternative or addition to searching a library of faces for similarity matches to the picture provided by a given user, one embodiment may also enable search for similar faces in closed and/or related sets. Examples of closed set include the user's own set, a set consisting of only the user's friends, or friends of friends datasets. Such an embodiment may have entertainment value, as well as enable a means by which individuals can be introduced to one another, such as through a social networking service.

While embodiments such as provided above detail similarity matching as between people, other embodiments may match a person to a dog or other animal. In order to determine recognition signatures for dogs, training and/or classification may be used to better correlate certain animal features, such as eye position, shape and color, to comparative features of people.

According to one embodiment, the face is the primary source of features for performing both recognition and determining similarity matching. Given a face, the system can extract features from the face that describe the given face. These features are then used to find similar faces. Similar faces will have closely matching features.

The more faces that exist in the database, the better the similarity search results will be. However, the features that describe the faces lie in a high-dimensional space and finding the most similar faces from a large high-dimensional dataset is extremely computationally expensive.

A search algorithm may a tree-structure such as described below to search the high-dimensional space efficiently. Such an embodiment may utilize a feature vector. In one embodiment, the feature vector includes of a face includes information derived from principal component analysis (PCA). PCA is applied to several regions of the detected face. In one implementation, the face feature vector includes the union of the PCA of all the face regions, which include the whole face, the left eye, and the right eye.

In another implementation, the face feature vector may include color histogram information. Specifically, color histograms may be computed for the hair region and the skin region of a person being recognized. The face is detected automatically, and the face position in the image can be used to determine a skin box and hair box in the image. The color histograms are computed for the skin and hair boxes.

Additionally, the feature vector includes information on the sex of the face, the ethnicity, and the hairstyle. This information can come from both automatic classification and from user provided data. Machine learning may be used to train classifiers to determine sex, ethnicity, and hairstyle from user data and the detected faces.

The different parts of the feature vector (PCA face and eye regions; skin and hair color histograms; and sex, ethnicity, and hair classification) are weighted by their importance and combined into a single face feature vector. The particular weighting used may be one of design implementation. The similarity of two faces is computed by comparing the two corresponding feature vector. In one embodiment, the similarity score is the sum of the absolute value difference of each term in the feature vector (the L1 distance norm). In another embodiment, an L2 norm distance can be used.

As an alternative or addition to searching a library of faces for similarity matches to the picture provided by a given user, one embodiment may also enable search for similar faces in only the user's own data set, and only in the user's friends, or friends of friends datasets. Such an embodiment may have entertainment value, as well as enable a means by which individuals can be introduced to one another, such as through a social networking service.

While embodiments such as provided above detail similarity matching as between people, other embodiments may match a person to a dog or other animal. In order to determine recognition signatures for dogs, training and/or classification may be used to better correlate certain animal features, such as eye position, shape and color, to comparative features of people.

In one embodiment, the image features used for similarity matching are image coloring. In one implementation, color histograms may be determined for the whole image and/or regions of the image. Images with the same color are more likely to be similar. Also, by comparing color histograms of regions, images with similar shape/structure are favored. In another embodiment, the color can be combined with texture information. Gabor filters is an example of a method for which texture features of objects appearing in an image may be determined. In another embodiment, a shape features appearing in the given image may also be used as well. As an example, but without any limitation, the shape features can be obtained via edge processing. In this case, the edges of the image are found first, and statistical characteristics of the edges are used as the shape features.

In one embodiment, the similarity score of two images is the weighted sum of the image feature match (color histograms) and the text tag match. The image feature is a vector (generated from the color histograms) and the L1 distance norm is used to compute the image match score. The text tag match is the number of matching tags weighted by their confidence. In another embodiment, only either of the image feature match or text tag match are used.

If there are no text tags, then only the image feature vector is used for similarity. These feature vectors are stored in the tree data structure, such as described elsewhere in this application, and are searched using the tree. The tree description is given in the next section. In another embodiment, the fast image matching algorithm is used as described in previous sections.

Similarity matching may be computationally intensive. In order to reduce the computational work for making comparisons of recognition signatures, a tree data structure may be utilized in a recognition signature index (e.g. recognition signature index 1252 of FIG. 12) as a basis for comparing recognition signature input to other signatures. As mentioned, a tree structure enables efficient search of large high-dimensional datasets. Partitioning a high-dimensional space with a tree will split some similar feature vectors so that they are far apart in the search tree even though they are near each other in the high-dimensional space. (A split here means a partition of the high dimensional space by a hyperplane.) To keep similar feature vectors together, the search algorithm uses multiple trees with different splitting points. The different split points in each tree are computed randomly with their probability determined by how split points partition the data. Having multiple trees with different split points will keep similar feature vectors close together in some of the trees, and lower the probability that similar feature vectors are missed entirely because they are far away in all the trees. The union of the search results from all the trees will yield a good set of similar results. This will keep the cost of searching the large dataset low and the number of missed similar results low.

In one embodiment, the tree is stored as a hashtable. The split points are used to compute a hash value that maps each feature vector to the corresponding hash bucket/leaf node. This hash function stores the hierarchical structure of the tree, so that the data/feature vectors can be stored in a flat hashtable.

The hash function can be generated in several ways. In one embodiment, The hash function can be generated completely randomly. In another embodiment, Locality Sensitive Hashtables (LSH), a related data structure, use random hash functions and multiple hash tables. In another embodiment, the other extreme is to greedily pick the hash function. The drawback of this approach is that it does not work for multiple hash functions. In yet another embodiment, the two approaches can be combined to generate multiple hash functions. Hash functions are sampled randomly while weighted in a greedy way.

It should be noted that similarity searching may extend beyond people compared to people. In one embodiment, the system allows users to select a region in the image and search for images having regions similar to the selected region. The system returns several results for this type of search. The first is the most matching text tags. Next is the image features and the text tags as in the previous section. And last is the image features without text tags.

In one embodiment, the system allows similarity searches on automatically detected text in the images. This does a text search of the top synonyms and associated words. This is an "or" search on the synonyms.

Social Network Applications

Photographs can be used to build a social network of people that know each other. Under one embodiment, a social network may be programmatically built in-part through image recognition and some of the techniques described with various other embodiments. For example, a service may be provided that scans images from members or other users. The service may operate under various assumptions that aid the social network development. One assumption is that two people know each other if they have a picture together. In one embodiment, a server maintains the images and tags collected from images in which recognition processes are performed. Using the face information in the images, the server can construct a social network for everybody registered with the service. The social network may exist in the form of data that interconnects two or more persons as associates (e.g. friends or acquaintance). Social interconnections amongst people may have a range of degrees of separation. A social networking service may manage such data, so as to know how persons are interconnected by one or more degrees of separation. Similarly, the server stores visual signatures for all the names/email addresses trained by users.

While a particular user may match faces images to email addresses in his address book, a process can be simplified for the user by pre-matching some of the faces using the information from the server. More specifically, one embodiment provides that a service downloads visual signatures for all or some of the email addresses in the user's address book. Then, these visual signatures are compared against the visual signatures of the faces found by the system. In one embodiment, a nearest neighbor classifier can be used for this comparison. In another embodiment, the weighted nearest neighbor is used for this comparison. The faces with visual signatures that are very close to the visual signatures of the address book entries are assigned to each other. In other words, the system would know those particular faces without any user input.

In another embodiment, the training sets can be shared along with shared photographs. For instance, if a Person A shares his photos of Person B with Person B, the system automatically gets the face signatures (training set) of Person B. In addition the system can share other related people's face signatures (training sets). For instance, the system can share the face signatures of Person A, and also the face signatures of people that co-occur frequently with Person B (in Person A's photo set). These shared training sets can be used for recognition in Person B's photo set. This way, many people are automatically recognized in Person B's photo set without any work from Person B.

In another embodiment, the images of a person can be obtained automatically via other websites. As an example, the person can be registered at a personal date site, or a social networking site. This websites usually carry the person's photograph, as well as friend's photographs in it. The system asks the user his access information to these web sites, such as login and password. Then, the system can go to these web sites, and automatically import the pictures, and add to the training set. This way, some photographs of the person are automatically recognized.

Photosense Application

As another application, embodiments enable the programmatic determination and/or assignment of suitable images from a library to a text content (such as an article or email). As described in previous sections, tags can be extracted from images, using recognition information and signatures, as well as metadata about the image. In one implementation, a service (e.g. server or host) collects tags and images for a library of images. The images are indexed using the extracted tags. In addition, an inverse index may be created such that, for given a tag, what is provided are all the images that contain that tag. In addition, the PicRank algorithm determines the most relevant images with that tag.

Any given text content may be subjected to inclusion of an image file. The text content may correspond to, for example, a text article or an email. The article may be inspected for purpose of determining what images may be relevant to it. For example, in one implementation, key words may be determined by counting reoccurring words and analyzing words in the title or subject line of an article. These words might be filtered by a proper noun dictionary if necessary. Once the most relevant words to the article are found, then the central server is connected and a search is applied on the index or tags of a library of images, using words of the article deemed to be most relevant. The most relevant search image results are returned, and they are automatically posted next to the images.

Figure 22:
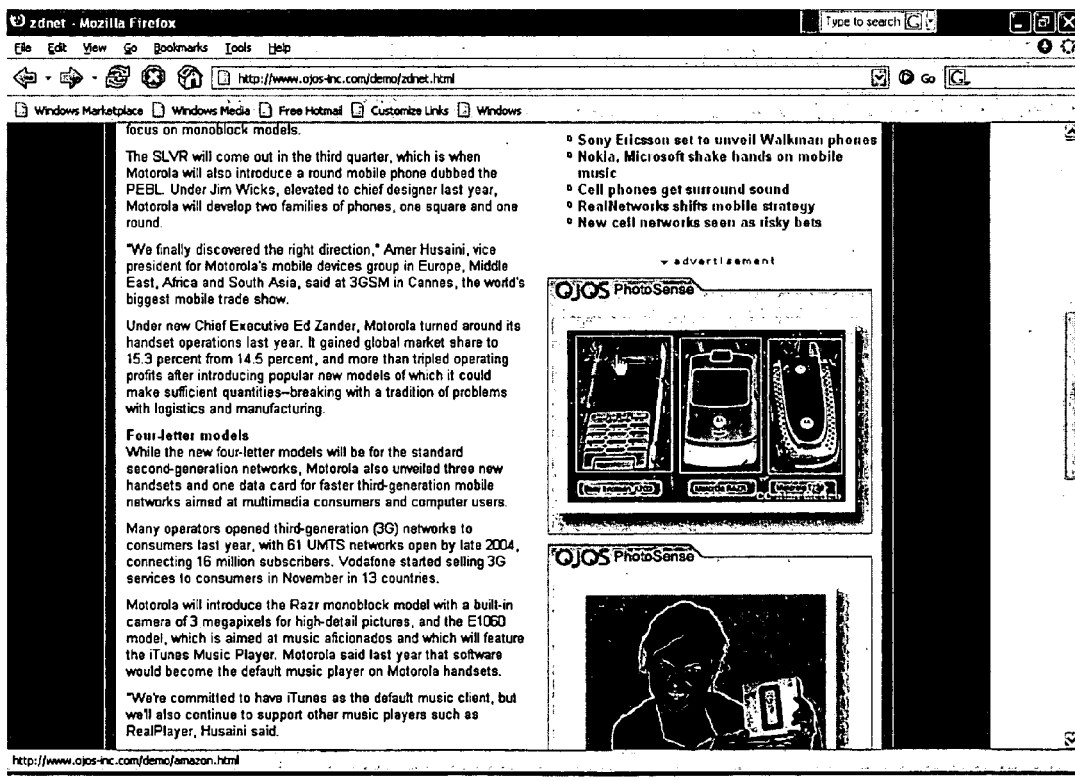
FIG. 22 illustrates an embodiment in which an image is selected for a text content.

As described with FIG. 16, for example, search results may be returned in an order of relevancy, using an algorithm that detects such relevancy. FIG. 22 illustrates an implementation of an embodiment described. In the example provided, the image matched to the article is commercial in nature, in that it shows an example of a device that is the subject of the article. Selection of the image may cause a link selection, so that the user's web browser is directed to a web site where the product in the image is sold, or where more information about the image or the underlying product is provided.

According to another embodiment, an overlay (such as shown in FIG. 20 and related embodiments) on the images can be shown when the mouse is on the images. When the user presses on the overlay, the page might be directed to the web page of the actual product item, or full search page of the item from the central server. This way, photos are included to add value to the article, as well as, ads are displayed in images, and in a non-disturbing manner to the user.

CONCLUSION

As mentioned, it is contemplated for embodiments of the invention to extend to individual elements and concepts described herein, independently of other concepts, ideas or system, as well as for embodiments to include combinations of elements recited anywhere in this application. Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. This, the absence of describing combinations should not preclude the inventor from claiming rights to such combinations.

What is claimed is:

1. A method for displaying images to a user, the method being implemented by one or more processors that perform steps comprising:

using one or more processors to perform steps comprising:
performing image analysis on a captured image to detect and identify one or more objects in the captured image, wherein performing the image analysis includes performing a recognition or similarity process that is selected or configured for a type of each of the one or more detected objects;
associating stored data corresponding to the captured image with information that identifies the one or more objects;
presenting the captured image using the stored data and the information in order to identify, and make selectable the one or more objects from the remainder of the captured image;
detecting a selection of one of the objects by the user when the captured image is presented; and
performing an action in response to detecting the selection of the object.

2. The method of claim 1, wherein performing an action includes displaying a content in response to detecting the selection.

3. The method of claim 2, wherein displaying the content includes selectively displaying the information that identifies the one or more objects.

4. The method of claim 2, wherein displaying a content in response to detecting the selection includes displaying additional information about the selected object, wherein the additional information is identified from the information that identifies the one or more objects.

5. The method of claim 2, wherein performing the action includes identifying other captured images that contain the same selected object.

6. The method of claim 2, wherein performing the action includes identifying other captured images that contain one or more objects that are determined to be relevant to the selected object.

7. The method of claim 1, wherein performing an action includes performing a search of other images using at least one search criterion corresponding to the given one of the one or more objects.

8. The method of claim 7, wherein the at least one search criterion is based on text data associated with the given one of the one or more objects.

9. The method of claim 7, wherein the at least one search criterion is based on recognition information determined from the given one of the one or more objects.

10. The method of claim 1, further comprising storing the data in a header of a file of the captured image.

11. The method of claim 1, wherein in detecting a selection of a given one of the one or more objects, the method further comprises determining a recognition signature of the selected object, and wherein performing the action that includes performing a search of a collection of images for any image that contains an object with a same or similar recognition signature.

12. A method for displaying images to a user, the method being implemented by one or more processors that perform steps comprising:

using one or more processors to perform steps comprising:
designating a kind of object to be detected from recognition analysis performed on captured images;
detecting one or more objects on a captured image, wherein the one or more objects are of the kind that are designated to be detected;
supplementing stored data that corresponds to the captured image with information that identifies each detected object; and using the stored data and the information that identifies each detected object to present the captured image with the detected objects wherein the detected objects are presented as being separately selectable;

detecting input corresponding to selection of one of the separately selectable objects apart from a remainder of the captured image; and responsive to detecting the input, displaying at least one of information or content that is selected based on the detected object.

13. The method of claim 12, wherein detecting one or more objects includes detecting at least a portion of a person in the image.

14. The method of claim 13, wherein displaying at least one of information or content includes displaying other captured images with the same detected person.

15. The method of claim 13, wherein detecting at least a portion of the person includes recognizing the person, and wherein displaying at least one of information or content that is selected based on the detected object includes displaying at least one of other images that are determined to have the same person.

16. The method of claim 12, wherein the object includes a face of the person.

17. The method of claim 12, wherein detecting one or more objects includes detecting an object carrying a text in the image.

18. The method of claim 17, further comprising recognizing the text, and wherein displaying at least one of information or content includes identifying one or more content or information that relate to the recognized text.

19. The method of claim 18, wherein the recognized text corresponds to a geographical identifier, and wherein displaying at least one of information or content includes displaying resources that include at least one of information and content about the geographical identifier.

20. The method of claim 18, wherein the recognized text corresponds to a business establishment, and wherein displaying at least one of information or content includes displaying resources that include at least one of information and content about the business establishment.

21. The method of claim 18, wherein identifying one or more content or information that relate to the recognized text includes identifying one or more web sites that are pertinent to the recognized text.

22. The method of claim 21, wherein identifying one or more web sites includes programmatically submitting the recognized text to a search engine.

23. An image viewing system comprising:

an image analyzer configured to (i) detect and identify one or more objects in a captured image and (ii) to associate stored data corresponding to the captured image with information that identifies the one or more objects;

a memory that stores (I) an image file of the data corresponding to the captured image, and (ii) the information that identifies the one or more objects; and a user-interface configured (i) to present the captured image, (ii) to identify and make selectable the one or more objects from the remainder of the image, and (iii) to perform an action in response to detecting the selection of one of the objects.

24. The image viewing system of claim 23, wherein the information that identifies the one or more objects in the image file is stored in a header of the image file.

25. The image viewing system of claim 23, wherein the information that identifies the one or more objects in the image file is stored external to the image file.

26. The image viewing system of claim 23, wherein the user-interface is configured to present an image using data from the image file, wherein the user-interface presents the one or more objects as interactive features of the image.

27. The image viewing system of claim 26, wherein the user-interface is configured to display information corresponding to the information that identifies one or more objects in the image file in response to a user action.

28. The image viewing system of claim 26, wherein the user-interface is configured to initiate a search for other images based on a user action.

* * * * *